United States Patent
Tahara et al.

(10) Patent No.: US 12,217,370 B2
(45) Date of Patent: Feb. 4, 2025

(54) INFORMATION PROCESSING APPARATUS AND INFORMATION PROCESSING

(71) Applicant: SONY GROUP CORPORATION, Tokyo (JP)

(72) Inventors: Tomu Tahara, Tokyo (JP); Tomoya Ishikawa, Tokyo (JP); Gaku Narita, Tokyo (JP); Takashi Seno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 332 days.

(21) Appl. No.: 17/755,722

(22) PCT Filed: Nov. 10, 2020

(86) PCT No.: PCT/JP2020/041812
§ 371 (c)(1),
(2) Date: May 6, 2022

(87) PCT Pub. No.: WO2021/095704
PCT Pub. Date: May 20, 2021

(65) Prior Publication Data
US 2022/0392174 A1    Dec. 8, 2022

(30) Foreign Application Priority Data
Nov. 15, 2019    (JP) .................. 2019-206604

(51) Int. Cl.
*G06T 19/00*    (2011.01)
*G06T 19/20*    (2011.01)
*G06V 20/20*    (2022.01)

(52) U.S. Cl.
CPC ............ *G06T 19/006* (2013.01); *G06T 19/20* (2013.01); *G06V 20/20* (2022.01); *G06T 2219/2004* (2013.01)

(58) Field of Classification Search
CPC .................. G06T 19/006; G06T 19/20; G06T 2219/2004; G06V 20/20
See application file for complete search history.

(56) References Cited

U.S. PATENT DOCUMENTS

| 2014/0267228 A1* | 9/2014 | Ofek ..................... G06T 19/006 345/419 |
| 2016/0196692 A1* | 7/2016 | Kjallstrom ............ G06T 19/006 345/633 |

(Continued)

FOREIGN PATENT DOCUMENTS

| CN | 105164731 A | 12/2015 |
| CN | 109997173 A | 7/2019 |
| JP | 2016-516241 A | 6/2016 |

OTHER PUBLICATIONS

International Search Report and Written Opinion of PCT Application No. PCT/JP2020/041812, issued on Jan. 19, 2021, 09 pages of ISRWO.

*Primary Examiner* — Myron Wyche
(74) *Attorney, Agent, or Firm* — CHIP LAW GROUP

(57) ABSTRACT

A template AR content can be favorably used in an application scene different from the scene at the time of creation. An environment map of an augmented reality application scene is generated. An abstract representation of the augmented reality application scene is generated on the basis of the environment map of the augmented reality scene. The abstract representation of the augmented reality application scene is compared with an abstract representation of a template augmented reality generated on the basis of a template augmented reality environment map, and template augmented reality content is mapped to the augmented reality application scene on the basis of a result of the comparison. Thus, augmented reality content for display is generated. For example, the abstract representation of the (Continued)

EXAMPLE OF DISPLAYED AR CONTENT augmented reality application scene or the abstract representation of the template augmented reality can be edited.

10 Claims, 31 Drawing Sheets

(56) References Cited

U.S. PATENT DOCUMENTS

| | | |
|---|---|---|
| 2018/0096528 A1 | 4/2018 | Needham et al. |
| 2019/0005724 A1* | 1/2019 | Pahud .................... G06F 3/011 |
| 2020/0004759 A1* | 1/2020 | Brebner .................... G06F 8/10 |

* cited by examiner

EXAMPLE OF DISPLAYED AR CONTENT

TEMPLATE SCENE

REPRESENTATION OF PROCESS OF EDITING ABSTRACT REPRESENTATION USING VIDEO DISPLAY DEVICE (DISPLAY, HMD, AR GLASSES, ETC.)

AR APPLICATION SCENE

USER

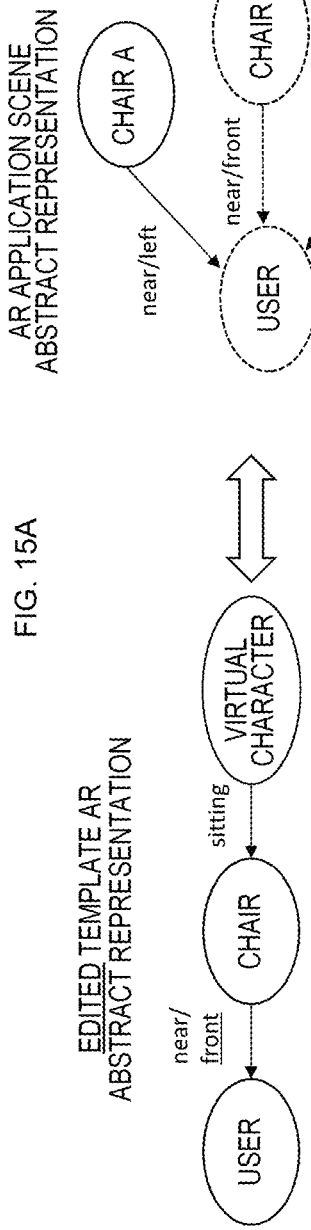
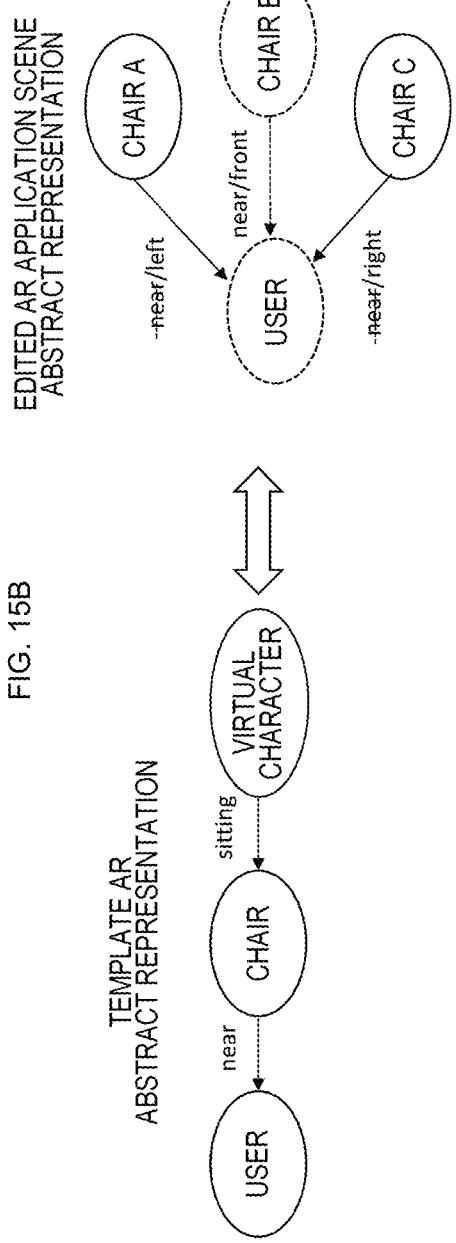
FIG. 15A
FIG. 15B

FIG. 19

TEMPLATE AR ENVIRONMENT MAP:
· THERE IS FLOOR SURFACE, ONE TABLE ON FLOOR SURFACE, AND FOUR CHAIRS ON FLOOR SURFACE.
· FOUR CHAIRS SURROUND TABLE.

AR APPLICATION SCENE ENVIRONMENT MAP:
· THERE IS FLOOR SURFACE, ONE TABLE ON FLOOR SURFACE, AND FOUR CHAIRS ON FLOOR SURFACE.
· FOUR CHAIRS SURROUND TABLE.

AR CONTENT TO BE DISPLAYED:
· FOUR CHARACTERS ARE SEATED, ONE ON EACH OF FOUR CHAIRS SURROUNDING TABLE.

FIG. 20

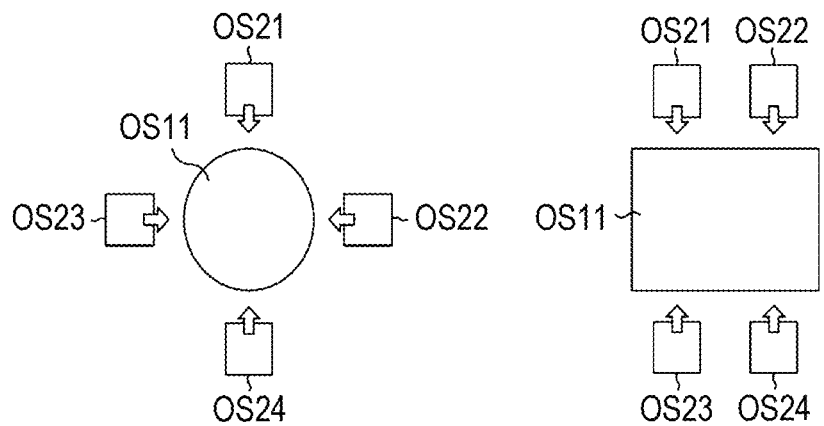

FIG. 21

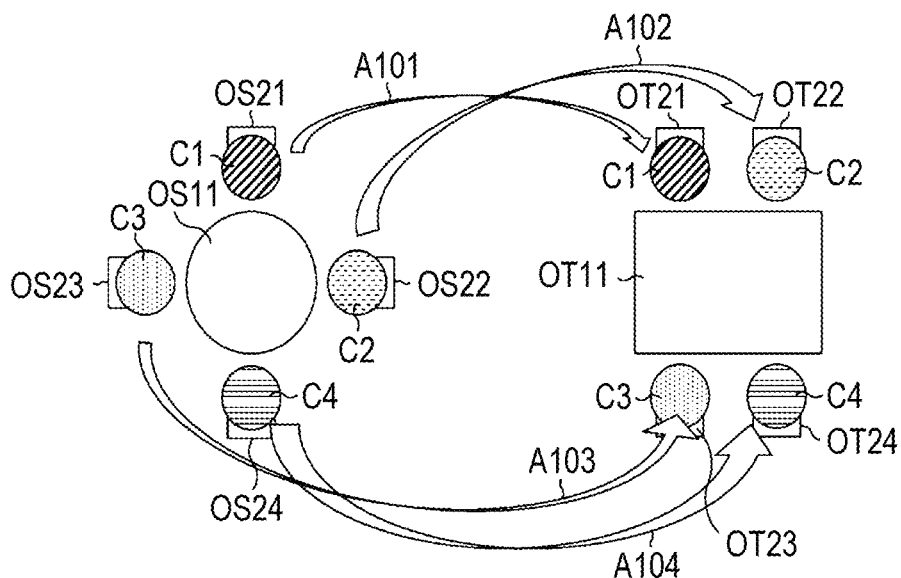

FIG. 22

TEMPLATE AR ENVIRONMENT MAP:

· THERE IS FLOOR SURFACE, ONE TABLE ON FLOOR SURFACE, AND FOUR CHAIRS ON FLOOR SURFACE.
· FOUR CHAIRS SURROUND TABLE.

AR APPLICATION SCENE ENVIRONMENT MAP:

· THERE IS FLOOR SURFACE, ONE TABLE ON FLOOR SURFACE, FOUR CHAIRS ON FLOOR SURFACE, AND ONE SOFA ON FLOOR SURFACE.
· THREE CHAIRS ARE LOCATED AT POSITIONS SURROUNDING TABLE, AND ONE CHAIR IS LOCATED AT POSITION AWAY FROM TABLE.
· ONE SOFA IS IN VICINITY OF TABLE.

AR CONTENT TO BE DISPLAYED:

· FOUR CHARACTERS ARE SEATED, ONE ON EACH OF THREE CHAIRS SURROUNDING TABLE AND ONE SOFA IN VICINITY OF TABLE.

TEMPLATE AR
ENVIRONMENT MAP

AR APPLICATION SCENE
ENVIRONMENT MAP

FIG. 25

TEMPLATE AR ENVIRONMENT MAP:
· THERE IS FLOOR SURFACE, ONE TABLE ON FLOOR SURFACE, AND FOUR CHAIRS ON FLOOR SURFACE.
· FOUR CHAIRS SURROUND TABLE.

AR APPLICATION SCENE ENVIRONMENT MAP:
· THERE IS FLOOR SURFACE, ONE TABLE ON FLOOR SURFACE, AND THREE CHAIRS ON FLOOR SURFACE.
· THREE CHAIRS SURROUND TABLE.

AR CONTENT TO BE DISPLAYED:
· ONE VIRTUAL CHAIR IS DISPLAYED AT POSITION SURROUNDING TABLE, AND FOUR CHARACTERS ARE SEATED, ONE ON EACH OF THREE CHAIRS THAT ACTUALLY EXIST AND ONE VIRTUAL CHAIR.

FIG. 26

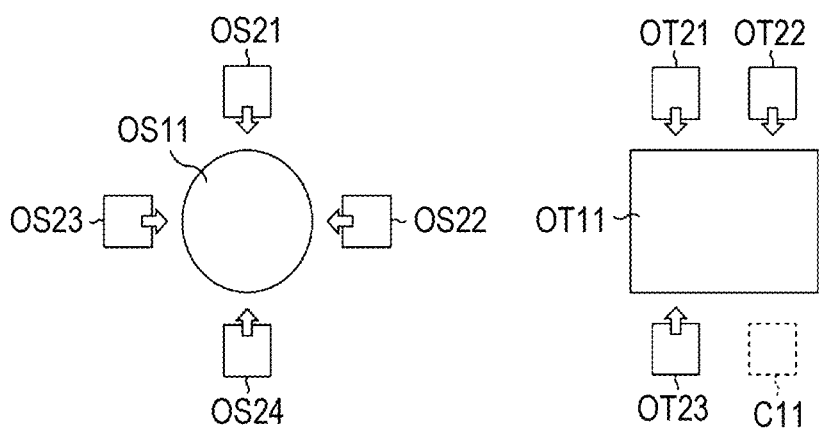

TEMPLATE AR ENVIRONMENT MAP    AR APPLICATION SCENE ENVIRONMENT MAP

TEMPLATE AR
ENVIRONMENT MAP

TEMPLATE AR
ABSTRACT REPRESENTATION

AR APPLICATION
SCENE ENVIRONMENT MAP

AR APPLICATION SCENE
ABSTRACT REPRESENTATION

AR APPLICATION
SCENE ENVIRONMENT MAP

AR APPLICATION SCENE
ABSTRACT REPRESENTATION

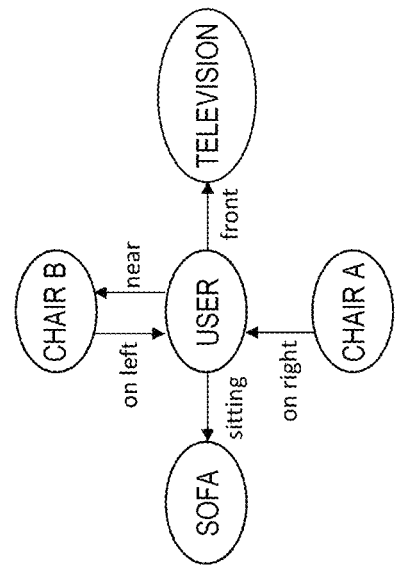
FIG. 38A
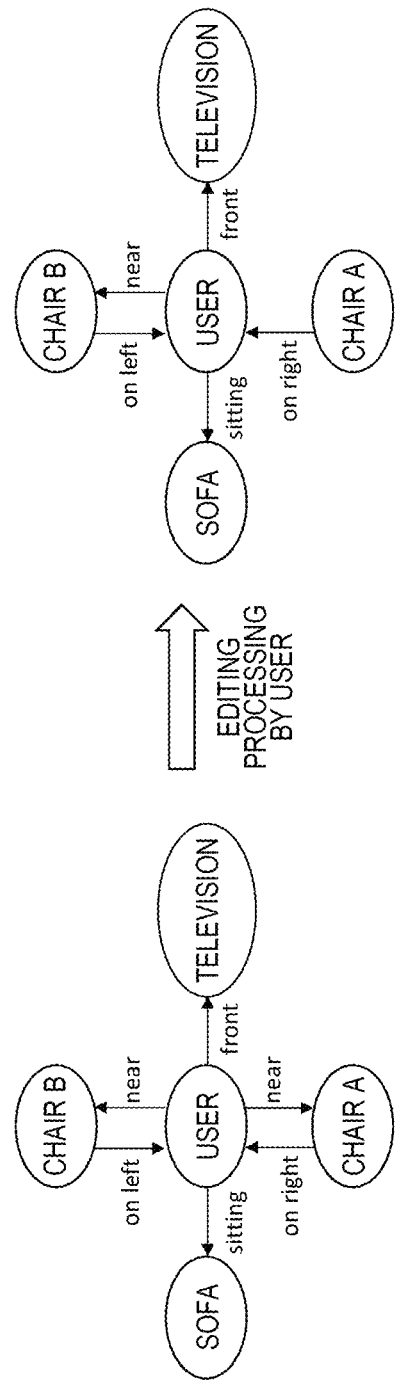
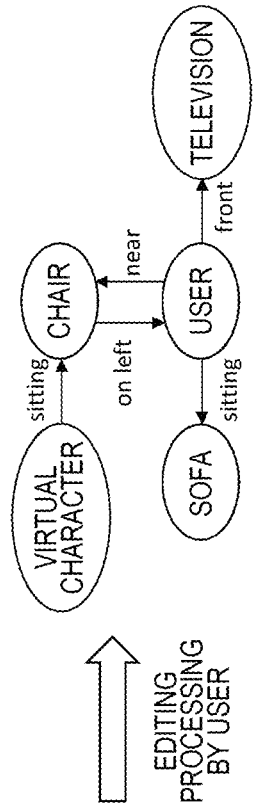
FIG. 38B
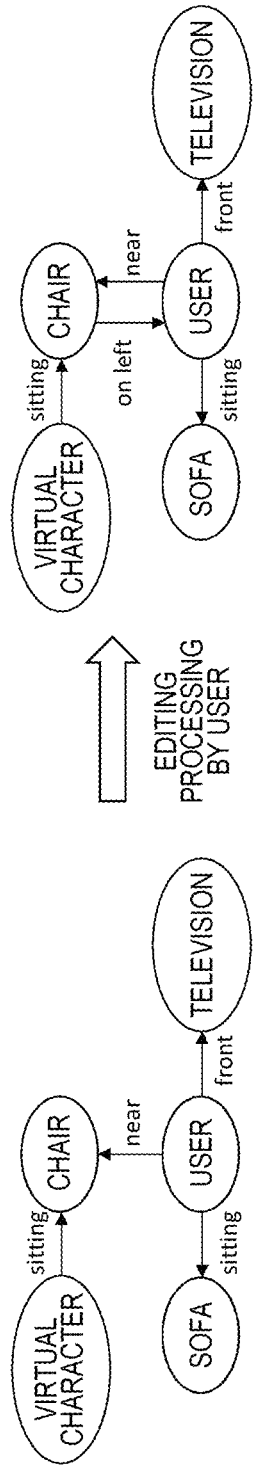

INFORMATION PROCESSING APPARATUS AND INFORMATION PROCESSING

TECHNICAL FIELD

The present technology relates to an information processing apparatus, an information processing method, and a program, and more particularly, to an information processing apparatus and the like for augmented reality display using augmented reality content generated on the assumption of a predetermined environment.

BACKGROUND ART

Template augmented reality (AR) content is conventionally known. The template AR content is created with the use of an environment map that can be acquired by measuring a normally assumed scene using various sensors such as an RGB camera, a depth sensor, and light detection and ranging (LiDAR). The environment map has information such as three-dimensional geometric information, attributes, quantity, and arrangement of objects in the scene.

When AR is applied, AR content is displayed, in which positions and postures of a user and an AR display device are identified for an environment map of an application scene acquired in advance using the sensors described above and, when necessary, an acceleration sensor, a global positioning system (GPS), and the like.

The above-described template AR content can normally be used only in a specific scene used at the time of creation. That is, there is a problem in that AR content created for a specific room cannot be correctly displayed in another room.

For example, Patent Document 1 proposes a technology aimed at allowing template AR content to be applied to an unknown scene different from the scene at the time of creation. In order to map an AR content experience to different environments, this technology uses geometric information and affordances in the scene as constraints to solve for an optimal mapping of the AR content.

CITATION LIST

Patent Document

Patent Document 1: Japanese Unexamined Patent Application Publication (Translation of PCT Application) No. 2016-516241

SUMMARY OF THE INVENTION

Problems to be Solved by the Invention

The technology described in Patent Document 1 has a problem in that the technology is based on the assumption that an ideal environment map and constraints similar to those in an original scene for which a template AR content has been created can be obtained even in an unknown scene. That is, in order allow a user to experience a template AR content in an unknown scene, it is necessary to accurately acquire information of the scene after performing a certain environment construction work that allows conditions of the original scene to be reproduced. This significantly limits the type of scene in which the template AR content can be experienced and the conditions of objects that exist in the scene.

Furthermore, there is also a problem in that AR experiences available from one template AR content are fixed to only one experience unless the AR application scene is changed. For the purpose of coping with variations in scene in which the user experiences AR or changes in conditions, or display as intended by the user, a large number of templates in accordance with assumed conditions are required, and the templates themselves need to be complicated. Moreover, there is no guarantee that the one fixed AR experience is the one intended by the user.

It is an object of the present technology to enable template AR content to be favorably used in an application scene different from the scene at the time of creation.

Solutions to Problems

A concept of the present technology lies in
an information processing apparatus including:
an environment map generation unit configured to generate an environment map of an augmented reality application scene;
an abstract representation generation unit configured to generate an abstract representation of an augmented reality application scene on the basis of the environment map of the augmented reality scene; and
a display augmented reality content generation unit configured to generate augmented reality content for display by comparing the abstract representation of the augmented reality application scene with an abstract representation of a template augmented reality generated on the basis of a template augmented reality environment map, and mapping template augmented reality content to the augmented reality application scene on the basis of a result of the comparison.

In the present technology, the environment map generation unit generates an environment map of an augmented reality application scene. Furthermore, the abstract representation generation unit generates an abstract representation of the augmented reality application scene on the basis of the environment map of the augmented reality scene. For example, the abstract representations may be representations having a graph structure.

The display augmented reality content generation unit compares the abstract representation of the augmented reality application scene with an abstract representation of a template augmented reality generated on the basis of a template augmented reality environment map. Then, on the basis of a result of the comparison, the display augmented reality content generation unit generates augmented reality content for display by mapping template augmented reality content to the augmented reality application scene.

As described above, in the present technology, the abstract representation of the augmented reality application scene is generated on the basis of the environment map of the augmented reality application scene, the abstract representation of the augmented reality application scene is compared with the abstract representation of the template augmented reality, and the template augmented reality content is mapped to the augmented reality application scene on the basis of the comparison result, and thus the augmented reality content for display is generated.

Thus, calculation processing for mapping the template augmented reality content to the augmented reality application scene can be reduced and simplified as compared with a case of comparing environment maps. Furthermore, by editing the abstract representation of the augmented reality application scene or the abstract representation of the template augmented reality, it is possible to appropriately display the template augmented reality content in accordance with the user's intention when the template augmented reality content is experienced in the augmented reality application scene of each individual user, and it is possible to increase the range of user's scenes (augmented reality application scenes) in which the template augmented reality content can be experienced.

Note that, in the present technology, for example, an abstract representation editing unit configured to edit the abstract representation of the augmented reality application scene or the abstract representation of the template augmented reality may be further included. In this case, for example, the abstract representation editing unit may include: an abstract representation presenting unit configured to present, to a user, the abstract representation of the augmented reality application scene and the abstract representation of the template augmented reality side by side; and a user interface unit configured to allow the user to perform an operation of making a change to the abstract representation of the augmented reality application scene or the abstract representation of the template augmented reality on the basis of the presentation. This allows the user to easily and appropriately perform an operation of making a change to the abstract representation.

Furthermore, in this case, for example, when a plurality of partially isomorphic portions corresponding to the abstract representation of the template augmented reality exists in the abstract representation of the augmented reality application scene, the abstract representation presenting unit may present the plurality of partially isomorphic portions in such a manner as to be recognizable by the user. This allows the user to easily recognize a plurality of partially isomorphic portions, and efficiently perform an operation of making a change to the abstract representation for appropriately displaying the template augmented reality content in accordance with the user's intention.

Furthermore, in this case, for example, when the abstract representation editing unit has edited the abstract representation of the augmented reality application scene or the abstract representation of the template augmented reality, the display augmented reality content generation unit may compare the abstract representation of the augmented reality application scene with the abstract representation of the template augmented reality after the change operation. This makes it possible to appropriately display the template augmented reality content in accordance with the user's intention when the template augmented reality content is experienced in the augmented reality application scene of the user, or makes it possible to increase the range of user's scenes in which the template augmented reality content can be experienced.

Furthermore, in this case, for example, an automatic editing unit configured to automatically edit the abstract representation of the augmented reality application scene generated by the abstract representation generation unit on the basis of information regarding editing the augmented reality application scene by the abstract representation editing unit may be further included. With this arrangement, when it is not desired to use a specific object in the augmented reality application scene at the time of displaying the augmented reality content, it is not necessary to perform an operation of deletion from the abstract representation for each piece of content.

Furthermore, in this case, for example, the abstract representations may be representations having a graph structure, and the editing may include an operation of changing a relationship between nodes or an operation of changing an attribute of a node. By including such a change operation, it is possible to effectively edit the abstract representation.

BRIEF DESCRIPTION OF DRAWINGS

FIG. 15 is a diagram for illustrating an example of editing abstract representations of a template scene and an AR application scene.

FIG. 19 is a diagram illustrating an example of a template AR environment map, an AR application scene environment map, and AR content to be displayed.

FIG. 20 is a diagram illustrating an example of positional relationships between objects in a template AR environment map and an AR application scene environment map.

FIG. 21 is a diagram illustrating an example of displacing a position of an object in template AR content.

FIG. 22 is a diagram illustrating an example of a template AR environment map, an AR application scene environment map, and AR content to be displayed.

FIG. 25 is a diagram illustrating an example of a template AR environment map, an AR application scene environment map, and AR content to be displayed.

FIG. 26 is a diagram illustrating an example of positional relationships between objects in a template AR environment map and an AR application scene environment map.

FIG. 38 is a diagram illustrating an example of an abstract representation of a scene acquired in an AR application scene environment map (map C) and an edited abstract representation.

MODE FOR CARRYING OUT THE INVENTION

Hereinafter, a mode for carrying out the invention (hereinafter referred to as "embodiment") will be described. Note that the description will be made in the order below.
1. Embodiment
2. Modified Example 1. Embodiment

[Information Processing System]

Figure 1:
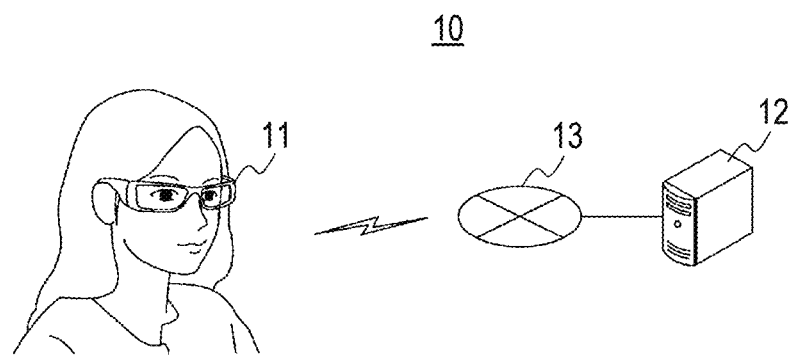
FIG. 1 is a diagram illustrating a configuration example of an information processing system as an embodiment.

FIG. 1 illustrates a configuration example of an information processing system 10 as an embodiment. The information processing system 10 has a configuration in which AR glasses 11 as an AR display apparatus and an information processing apparatus 12 are connected via a network 13 such as a local area network (LAN).

The AR glasses 11 are a glasses-type wearable terminal including a transmissive display unit. The AR glasses 11 display a video including various objects such as a character on the display unit under the control of the information processing apparatus 12 performed via the network 13. A user sees the objects as AR content superimposed on a scenery in front of the user. The method of projecting the video including the objects may be a virtual image projection method or a retinal projection method in which the video is directly formed as the image on a retina of a user's eye.

The information processing apparatus 12 reproduces the AR content and transmits video data obtained by the reproduction to the AR glasses 11, thereby causing the AR glasses 11 to display the video of the AR content. The information processing apparatus 12 is constituted by, for example, a personal computer (PC). Note that the AR display apparatus is not limited to the AR glasses 11, and may be a transmissive head mounted display (HMD), a smartphone, or the like, instead of the AR glasses 11.

Figure 2:
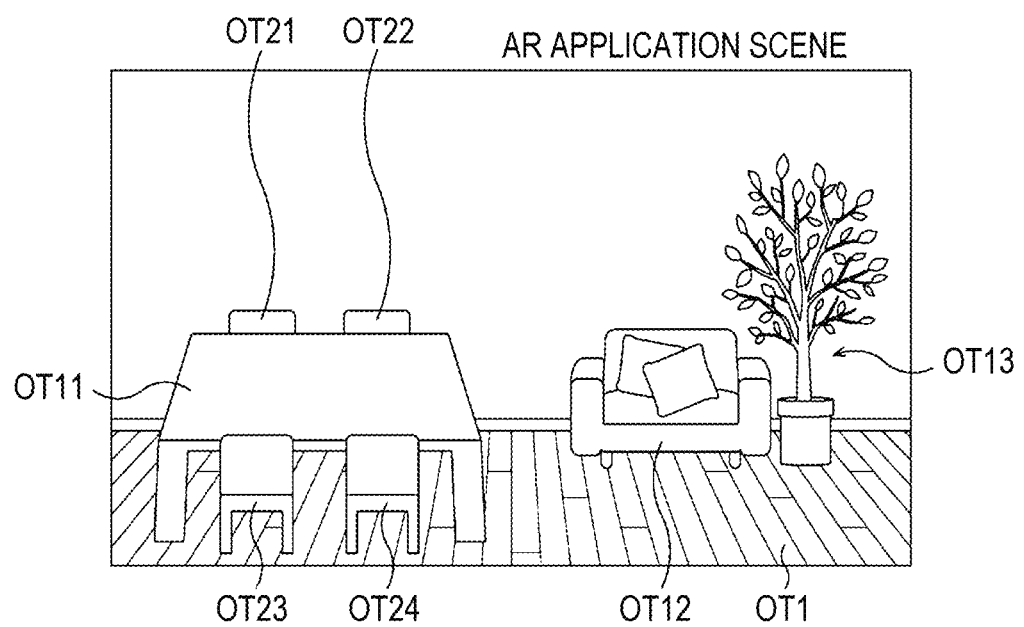
FIG. 2 is a diagram illustrating an example of an actual scene.

FIG. 2 illustrates an example of an AR application scene. It is assumed that a user who views AR content is wearing the AR glasses 11 and is in a living room as illustrated in FIG. 2. This AR application scene is an actual scene in which the user views the AR content.

Objects that exist in this AR application scene include an object OT1, which is a floor surface, an object OT11, which is a table, objects OT21 to OT24, which are chairs, an object OT12, which is a sofa, and an object OT13, which is a house plant. The objects OT21 to OT24, which are four chairs, are arranged with their front sides facing the object OT11, which is a table having a substantially square top. Furthermore, the object OT12, which is a sofa, is arranged in the vicinity of the object OT11.

When the AR content is reproduced by the information processing apparatus 12 and video data of the AR content is transmitted to the AR glasses 11, the video of the AR content is displayed so as to be superimposed on the AR application scene.

Figure 3:
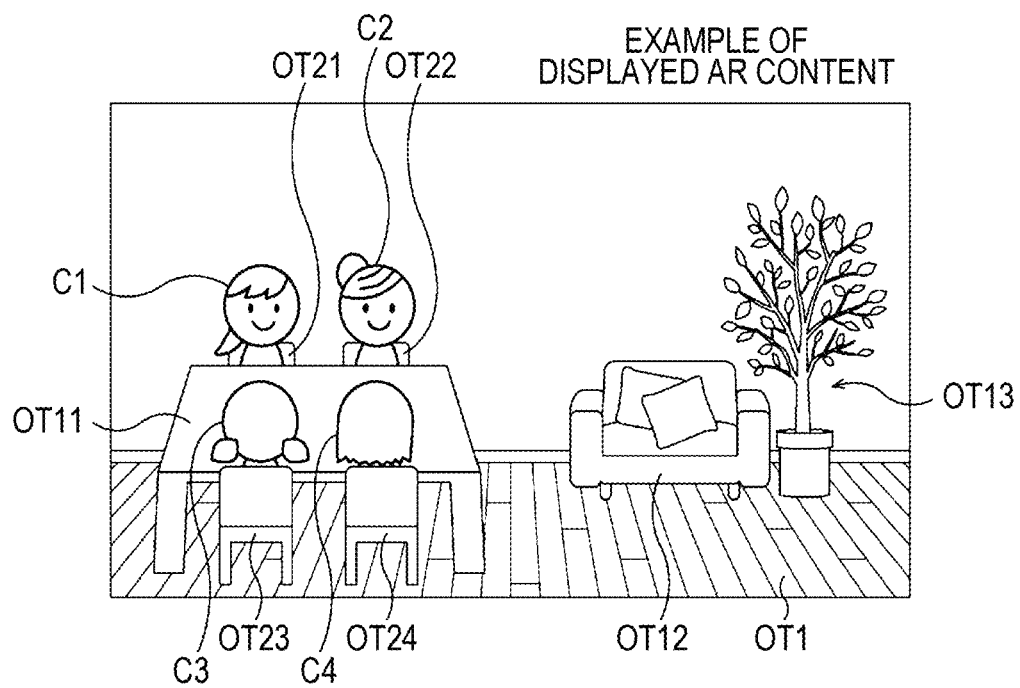
FIG. 3 is a diagram illustrating an example of displayed AR content.

FIG. 3 illustrates an example of displayed AR content. In this display example, a video is displayed in which four characters C1 to C4 as objects are sitting, one on each of the objects OT21 to OT24, which are chairs. The user sees the characters C1 to C4 sitting on the objects OT21 to OT24 that actually exist in front of the user.

Objects including the characters C1 to C4 have, for example, three-dimensional shapes. The way the objects look such as their sizes and angles changes depending on the position and posture of the user in a three-dimensional space.

Hereinafter, cases where an object included in AR content is a human-like character will be mainly described. Alternatively, other objects such as an animal, a vehicle, furniture, and a building can be used as the object.

The AR content used to display such a video is generated by the information processing apparatus 12 on the basis of template AR content, which is AR content prepared in advance as a template. The AR content to be displayed is generated by, for example, performing mapping in which the arrangement of objects in the template AR content is changed in accordance with the actual scene.

The AR application scene is an unknown scene for the information processing apparatus 12 until the three-dimensional shape is measured. The AR content to be displayed is generated by applying, to the unknown scene, the template AR content generated on the assumption of a specific scene.

The template AR content has a configuration in which the objects are arranged in a three-dimensional space represented by a three-dimensional shape of the specific scene assumed as a template.

Here, an environment including the three-dimensional shape of each scene is represented by an environment map. The environment map includes information representing the three-dimensional shape of the scene and information regarding objects that exist in the scene. The information regarding the objects represents the attributes, quantities, positions, and the like of the objects.

The three-dimensional shape of the template scene, which is the scene assumed as a template, is represented by a template AR environment map. The template AR environment map includes information representing the three-dimensional shape of the template scene and information regarding the objects that exist in the template scene. The template scene is a known scene for the information processing apparatus 12.

Figure 4:
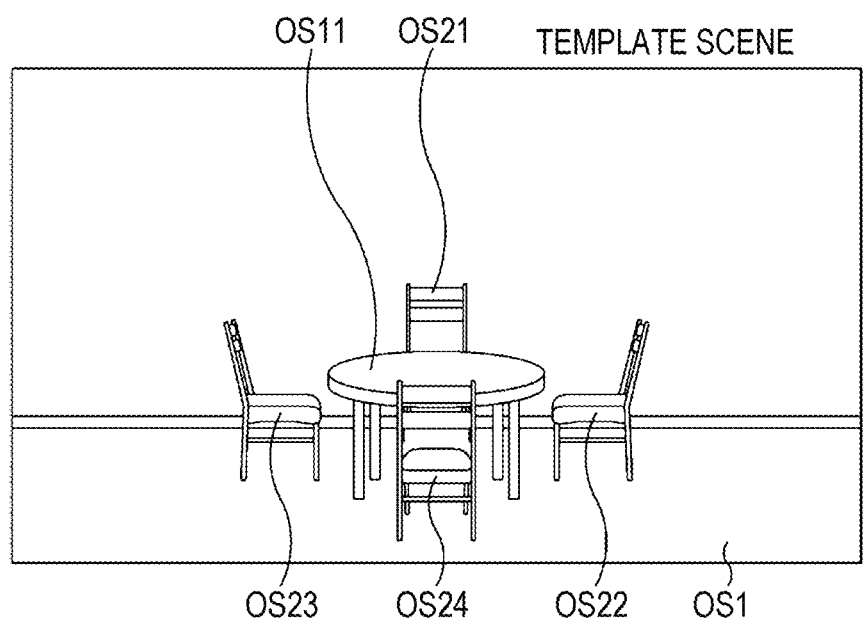
FIG. 4 is a diagram illustrating an example of a template scene.

FIG. 4 illustrates an example of a template scene. The template scene in this example is a scene assuming a specific living room. In this template scene, there are an object OS1, which is a floor surface, an object OS11, which is a table, and objects OS21 to OS24, which are chairs. The objects OS21 to OS24, which are four chairs, are arranged with their front sides facing the object OS11, which is a table having a circular top.

The template AR environment map represents the three-dimensional shape (the three-dimensional shape of the template scene), attribute, quantity, position, and the like of each of the object OS1, the object OS11, and the objects OS21 to OS24.

Figure 5:
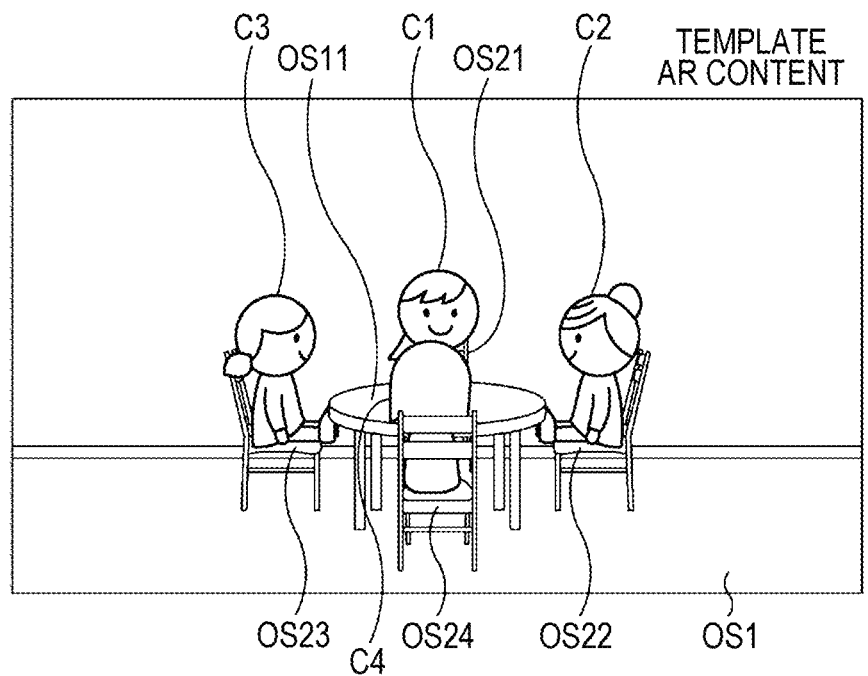
FIG. 5 is a diagram illustrating an example of template AR content.

FIG. 5 illustrates an example of template AR content. The template AR content has a configuration in which objects having three-dimensional shapes are arranged in a template scene. Here, the template AR content is constituted by a video in which the four characters C1 to C4 as objects are sitting on the objects OS21 to OS24, which are chairs, respectively. The template AR content includes video data of the characters C1 to C4 sitting on the objects OS21 to OS24.

The AR content is reproduced on the basis of the AR content to be displayed that has been generated by processing, in accordance with the AR application scene, the template AR content including the video of the characters in such a template scene.

When the AR content to be displayed is generated, the AR application scene is measured, and an AR application scene environment map, which is an environment map representing the three-dimensional shape of the AR application scene and the like, is generated. The AR application scene environment map represents the three-dimensional shape (three-dimensional shape of the actual scene), attribute, quantity, position, and the like of each of the object OT1, the object OT11, the objects OT21 to OT24, and the like in FIG. 2.

Furthermore, the AR content to be displayed in FIG. 3 is generated on the basis of the template AR content in FIG. 5, the AR content to be displayed being for making the characters C1 to C4 look as if the characters are sitting on the objects OT21 to OT24 that actually exist, when the position and posture of the user in the AR application scene are estimated and the position and posture of the user are used as a reference.

The AR content to be displayed that has been generated in this way is reproduced, and thus the way the objects look as described with reference to FIG. 3 is achieved.

In the present technology, content to be displayed is generated by generating an abstract representation of an AR application scene on the basis of an AR application scene environment map, comparing the abstract representation of the AR application scene with a template AR abstract representation, and mapping template AR content to the AR application scene on the basis of a result of the comparison. Furthermore, in the present technology, the abstract representation of the AR application scene or the template AR abstract representation is edited as necessary.

"Processing According to Present Technology"

Figure 6:
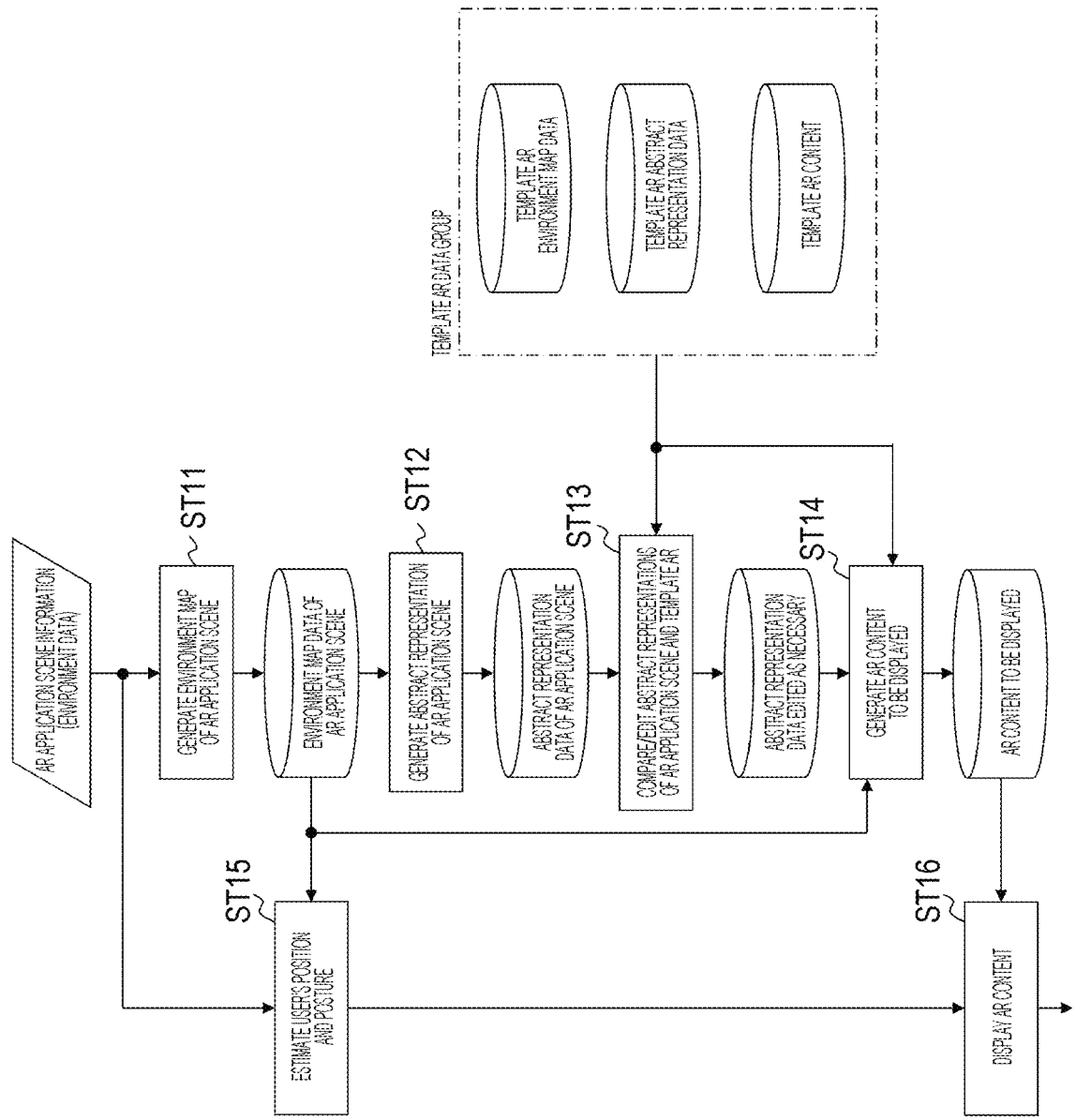
FIG. 6 is a flowchart illustrating an example of a flow of processing according to the present technology.

A flowchart in FIG. 6 illustrates an example of a flow of processing according to the present technology. Each piece of processing in the flowchart in FIG. 6 is performed by, for example, the information processing apparatus 12.

In the processing of step ST11, an AR application scene environment map is generated. The AR application scene environment map is generated on the basis of information regarding an AR application scene (time-series RGB images, range images, point clouds, and the like acquired by various sensors such as an RGB camera, a depth sensor, and LiDAR). The AR application scene environment map can be generated by, for example, a method described in a non-patent document (G. Narita et al. Panopticfusion: Online volumetric semantic mapping at the level of stuff and things. In IEEE/RSJ Int. Conf. on Intelligent Robots and Systems (IROS), 2019) or the like.

The AR application scene environment map is constituted by a scene in which the attribute including three-dimensional geometric information or semantic information, the quantity, and the like are associated, one or more objects that exist in the scene, and a relative positional relationship between the objects. Examples of a method of representing three-dimensional geometric information include, but are not necessarily limited to, a technique using a voxel space or a truncated signed distance.

The attribute is defined as an identifiable label representation such as an object category, an object ID, a material, a color, or an affordance. The relative positional relationship between the objects is represented by, for example, just the position of each object in the same coordinate system, or the positions and postures (rotation and translation) including the orientations of the objects.

Figure 7:
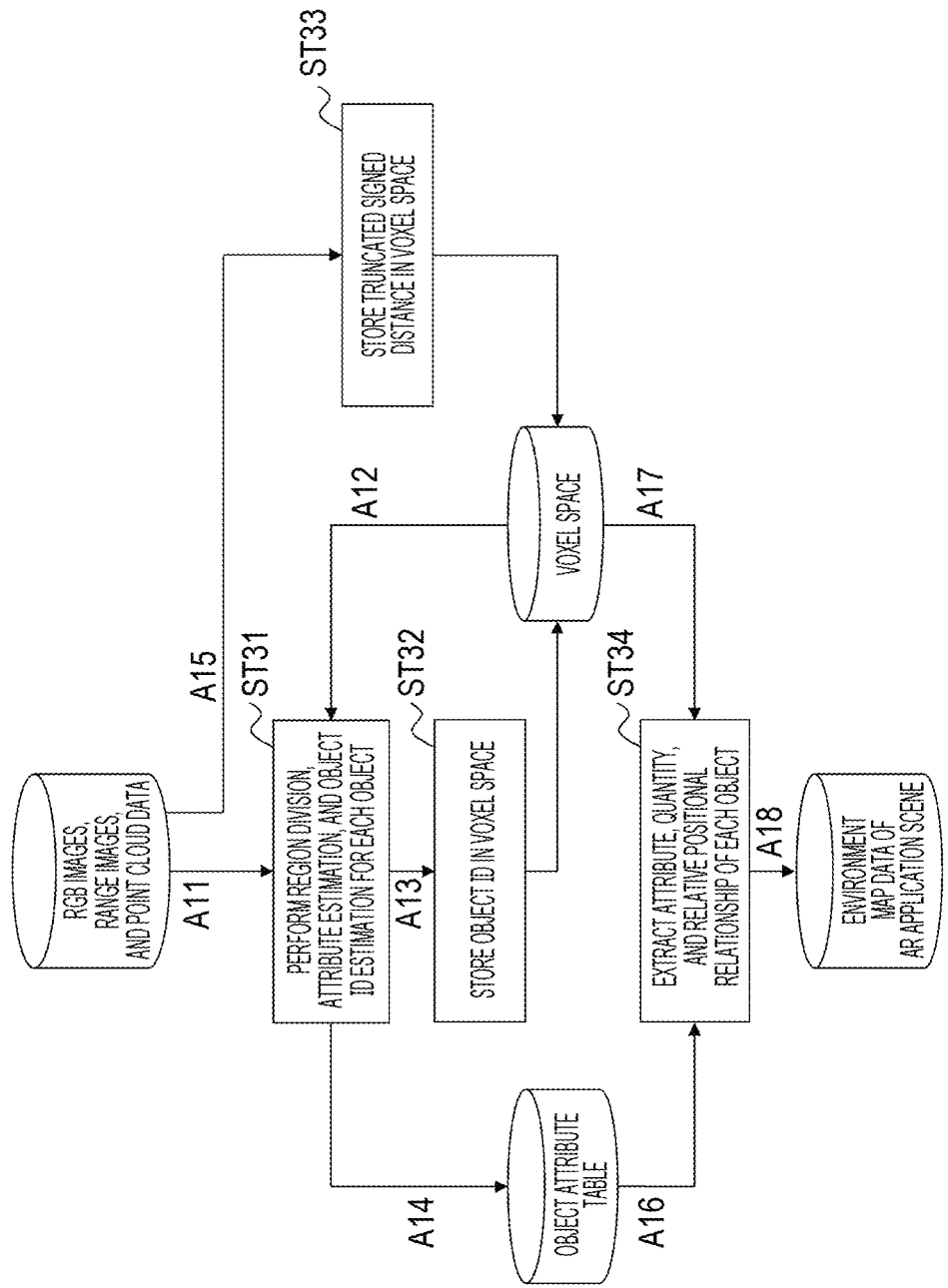
FIG. 7 is a flowchart illustrating an example of a processing procedure for processing of generating an AR application scene environment map (real environment map).

A flowchart in FIG. 7 illustrates an example of a processing procedure for processing of generating an AR application scene environment map (real environment map). The AR application scene environment map is generated on the basis of AR application scene information including RGB images, range images, point cloud data, and the like. For example, the AR application scene information is repeatedly transmitted from the AR glasses 11 to the information processing apparatus 12 at a predetermined cycle.

For example, a voxel space constituted by a voxel storing a truncated signed distance to a surface of an object that exists in an AR application scene and an object ID for uniquely distinguishing an object that exists in the AR application scene is prepared. Furthermore, an object attribute table for managing an attribute of each object is prepared.

First, as pointed by an arrow A11, as processing of step ST31, the information processing apparatus 12 performs region division, attribute estimation, and object ID estimation of an object represented by an image or a point cloud on the basis of RGB images, range images, and point cloud data. The region of each object that exists in the actual scene is identified by the region division. Furthermore, the attribute of the object is estimated by the attribute estimation.

The information processing apparatus 12 has data for estimating the attribute of the object on the basis of a feature such as the shape represented by an image or point cloud data.

By the object ID estimation, the region is identified, and the object ID of each of the objects for which the attribute has been estimated is estimated. The object ID estimation is processing necessary for achieving consistency with the object ID assigned to the object, and is performed as appropriate with reference to the object ID already stored in the voxel space as indicated by an arrow A12. Furthermore, the object ID may be estimated on the basis of a result of object tracking processing based on images or point cloud data input as time-series data.

As pointed by an arrow A13, as processing of step ST32, the information processing apparatus 12 stores, in the voxel space, the object ID estimated by the object ID estimation on the basis of the range images or the point cloud data. The object ID is set as information of a voxel at a position corresponding to the distance to the object.

As pointed by an arrow A14, the information processing apparatus 12 stores, in the object attribute table, a result of the attribute estimation for each object and a result of the object ID estimation. In the object attribute table, the attribute of each object is managed in association with the object ID.

As pointed by an arrow A15, as processing of step ST33, the information processing apparatus 12 calculates a truncated signed distance to the object surface of each object on the basis of the RGB images, range images, and point cloud data, and stores the truncated signed distance in the voxel space. The information stored in the voxels constituting the voxel space represents the ID of the object at the position corresponding to each voxel.

A method of calculating a truncated signed distance and a method of storing the truncated signed distance in a voxel space are disclosed in, for example, a non-patent document (Newcombe, Richard A., et al. "KinectFusion: Real-time dense surface mapping and tracking." Mixed and augmented reality (ISMAR), 2011 10th IEEE international symposium on. IEEE, 2011).

As pointed by arrows A16 and A17, as processing of step ST34, the information processing apparatus 12 integrates the information in the voxel space and the information in the object attribute table, and extracts the three-dimensional shape of the AR application scene, the attribute and position of each object that exists in the AR application scene, and the relative positional relationship between the objects. As pointed by an arrow A18, the information processing apparatus 12 stores information including the extracted information as an AR application scene environment map.

Figure 8:
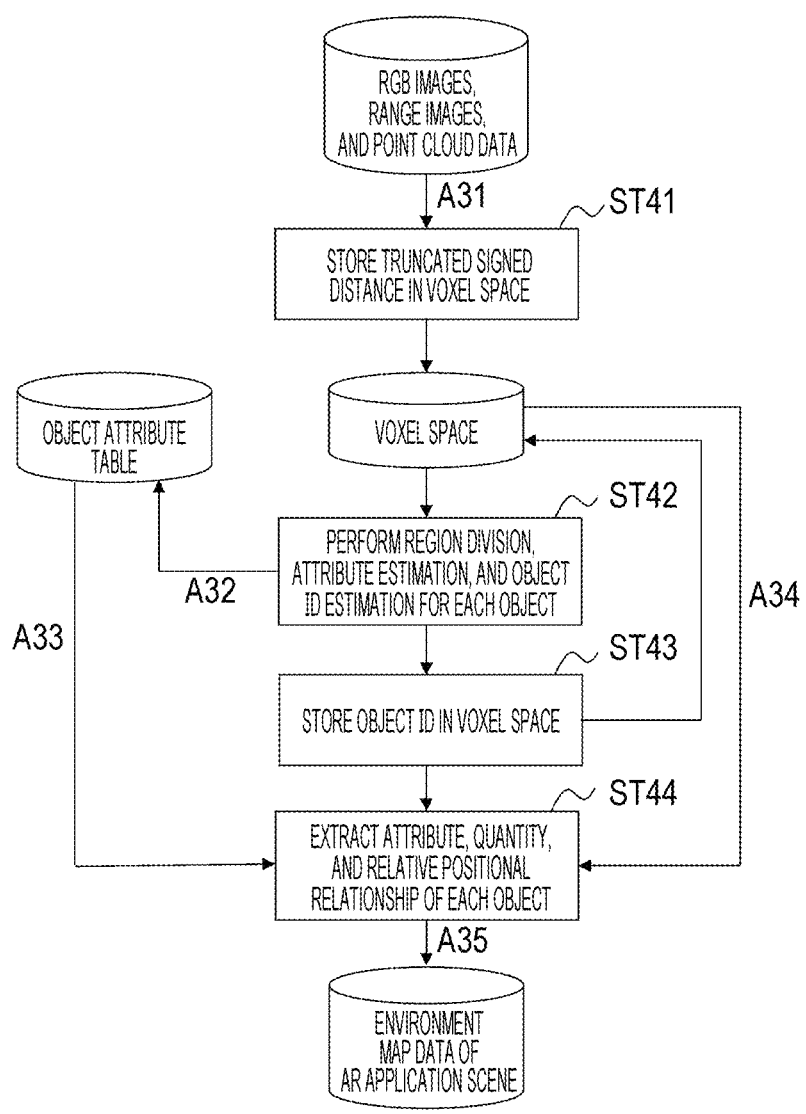
FIG. 8 is a flowchart illustrating another example of the processing procedure for processing of generating an AR application scene environment map (real environment map).

A flowchart in FIG. 8 illustrates another example of the processing procedure for processing of generating an AR application scene environment map (real environment map). In this generation processing, a truncated signed distance is stored in a voxel space first, and region division, attribute estimation, object ID estimation, and the like of an object are performed on the basis of information stored in the voxel space.

That is, as pointed by an arrow A31, as processing of step ST41, the information processing apparatus 12 calculates a truncated signed distance to the object surface of each object on the basis of the RGB images, range images, and point cloud data, and stores the truncated signed distance in the voxel space.

In step ST42, the information processing apparatus 12 extracts an array of truncated signed distances, point cloud data, a mesh, and the like from the voxel space, and performs region division, attribute estimation, and object ID estimation of an object on the basis of the extracted information.

The subsequent processing is similar to the processing described with reference to the flowchart in FIG. 7. That is, as processing of step ST43, the information processing apparatus 12 stores the object ID estimated by the object ID estimation in the voxel space. As pointed by an arrow A32, the information processing apparatus 12 stores, in the object attribute table, a result of the attribute estimation for each object and a result of the object ID estimation.

As pointed by arrows A33 and A34, as processing of step ST44, the information processing apparatus 12 integrates the information in the voxel space and the information in the object attribute table, and extracts the three-dimensional shape of the AR application scene, the attribute and position of each object that exists in the AR application scene, and the relative positional relationship between the objects. As pointed by an arrow A35, the information processing apparatus 12 stores information including the extracted information as an AR application scene environment map.

As described above, the order of the pieces of processing of the steps regarding generation of an AR application scene environment map can be changed as appropriate. Furthermore, as a technology used for the processing of generating an AR application scene environment map, it is possible to adopt various technologies for estimating the three-dimensional shape and the like of the AR application scene on the basis of an RGB image captured by a camera or results of measurement by various sensors.

Returning to the description of FIG. 6, in the processing of step ST12, an abstract representation of the AR application scene is generated on the basis of the AR application scene environment map. The abstract representation of the AR application scene is defined as a representation having a graph structure in which objects and a user that exist in the AR application scene are set as nodes, and the nodes are connected via labeled edges and relationship nodes.

In this case, unrelated nodes do not have a connection relationship. Furthermore, a relationship between objects is represented by, for example, a representation using an abstract description in a natural language. For example, when a chair that exists in a living scene is arranged near a table, a connection relationship using a relationship label "near" can be defined between a chair node and a table node.

A relationship between objects defined in advance can be estimated by extracting, from an acquired environment map, three-dimensional information in units of objects corresponding to a subject and an object of the relationship, information regarding their positions and postures, and the like, and using information regarding the distance between each other and the orientations. At this time, when necessary, the three-dimensional information of the objects in the dense environment map may be abstracted and simplified by using "3D bounding box" or the like.

Furthermore, estimation of the relationship based on the information regarding the distance between the two objects and the orientations can be performed by, for example, calculating a Euclidean distance and an angle formed by a vector corresponding to the front direction of each object, and performing appropriately determined threshold processing. At this time, information (e.g., an RGB-D image sequence) measured when the environment map has been acquired may be used, and a neural network using those pieces of information as an input may be used for inference.

Typical relationship labels include labels representing spatial positional relationships (front, behind, left, right, on, above, under, near, etc.). In addition, a predicate relationship of a subject to an object or a state associated therewith may be treated as a relationship label. Examples of this include "a chair 'has' a seat" and "a virtual character is 'sitting' on a chair".

Furthermore, a relationship between objects may be defined in units of groups constituted by a plurality of objects. This includes, for example, "a table is 'surrounded' by chairs". The relationship defined in units of groups may be acquired as a result of integrating relationships between objects on a one-to-one basis, or may be estimated by using, from the start, all pieces of information of a plurality of objects.

As a structure of a graph used as an abstract representation, in addition to a representation in which a relationship between objects as nodes is defined by edge labels, for example, a directed graph representation in which objects, attributes, and relationships are connected to each other as nodes can be used, the directed graph representation being proposed in a non-patent document (J. Johnson et al. Image Retrieval using Scene Graphs. In Proceedings of the IEEE Conference on Computer Vision and Pattern Recognition (CVPR), pages 3668-3678. IEEE, 2015). Furthermore, for example, as in a non-patent document (R. Ma et al. Language-Driven Synthesis of 3D Scenes from Scene Databases. SIGGRAPHASIA, 2018), a relationship node that aggregates relationships between a plurality of objects may be used for the representation.

Figure 9B:
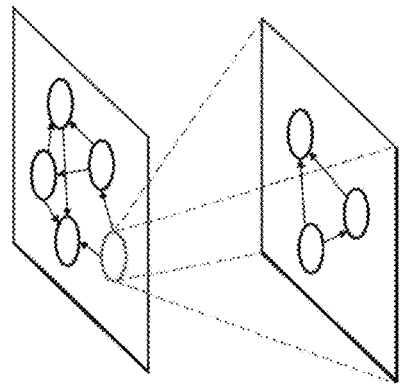
FIG. 9 is a diagram for illustrating a structure of a graph used as an abstract representation.
Figure 9A:
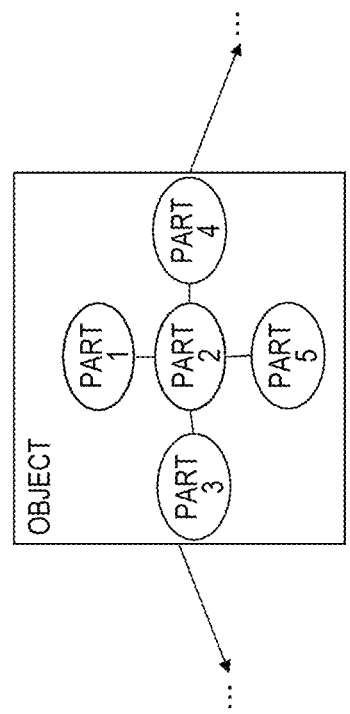

As long as matching between graphs can be obtained, one scene may be abstractly described with a set of two or more graphs, the graphs being provided one for each of subscenes obtained by dividing one scene into pieces, one for each group of objects. Furthermore, one object may be divided into pieces, one for each part or region, as a set of two or more nodes (see FIG. 9(a)). Alternatively, a graph may be hierarchized on the basis of high-level concepts (see FIG. 9(b)).

Figure 10:
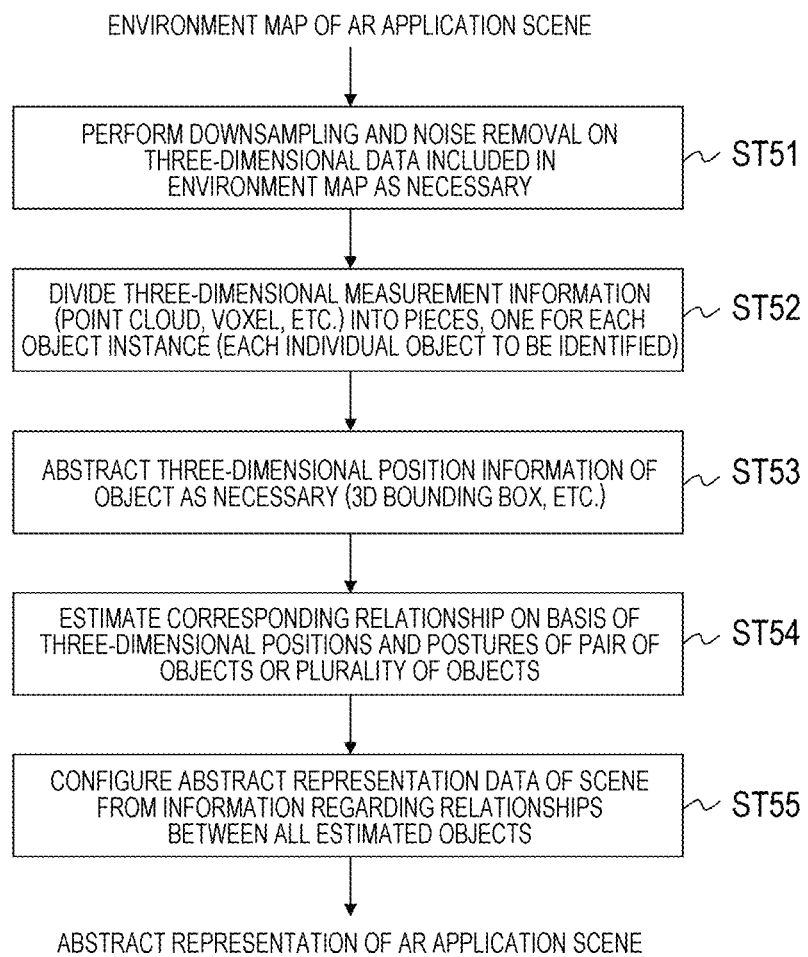
FIG. 10 is a flowchart illustrating an example of a processing procedure for processing of generating an abstract representation of an AR application scene.

A flowchart in FIG. 10 illustrates an example of a processing procedure for processing of generating an abstract representation of an AR application scene.

First, in step ST51, the information processing apparatus 12 performs processing such as downsampling and noise removal on three-dimensional data included in an environment map as necessary. Next, in step ST52, the information processing apparatus 12 divides three-dimensional measurement information (point cloud, Voxel, or the like) into pieces, one for each object instance (each individual object to be identified).

Next, in step ST53, the information processing apparatus 12 abstracts the three-dimensional position information of the object with the use of, for example, "3D bounding box" as necessary. Next, in step ST54, the information processing apparatus 12 estimates a corresponding relationship on the basis of three-dimensional positions and postures of a pair of objects or a plurality of objects. Next, in step ST55, the information processing apparatus 12 configures abstract representation data of the AR application scene from information regarding the relationships between all the estimated objects.

Returning to the description of FIG. 6, a template AR data group is held by the information processing apparatus 12 and includes a predetermined number of pieces of template AR data. Each piece of template AR data includes a template AR environment map, a template AR abstract representation, and template AR content.

Similarly to the above-described AR application scene environment map, the template AR environment map is constituted by a scene in which the attribute including three-dimensional geometric information or semantic information, the quantity, and the like are associated, one or more objects that exist in the scene, and a relative positional relationship between the objects. The template AR environment map may be acquired by measuring in advance an AR application scene assuming AR application, or may be acquired by arranging a three-dimensional CAD (3D CAD) model in a virtual space such as a game engine.

The template AR abstract representation is generated on the basis of the template AR environment map, in a similar manner to the above-described abstract representation of the AR application scene. The template AR abstract representation is defined as a representation having a graph structure in which objects and a user that exist in a template scene and virtual objects such as characters used for AR content presentation are set as nodes, and the nodes are connected via labeled edges and relationship nodes. The template AR content has a configuration in which the virtual objects are arranged in the template scene in which a three-dimensional shape or the like is represented by the template AR environment map.

In the processing of step ST13, the abstract representation of the AR application scene and the template AR abstract representation corresponding to the template AR content used in the AR application scene are presented for comparison, and the abstract representations are edited by the user as necessary.

When the structure obtained by removing the virtual objects from the template AR abstract representation is included in the AR application scene abstract representation (partially isomorphic), the content is mapped such that an object node in the AR application scene is associated with an object node in the template AR content, and thus the template AR content can be reproduced in another space.

On the other hand, in the AR application scene (real environment), as described above, it is not always possible to prepare a situation in which a context (scene condition) set in advance in the template AR content is reproduced. This corresponds to the template AR abstract representation not being necessarily included in the abstract representation of the AR application scene. In such a case, by editing the abstract representation of each scene, it is possible to achieve AR adaptive display in accordance with individual AR application scenes.

Figure 11:
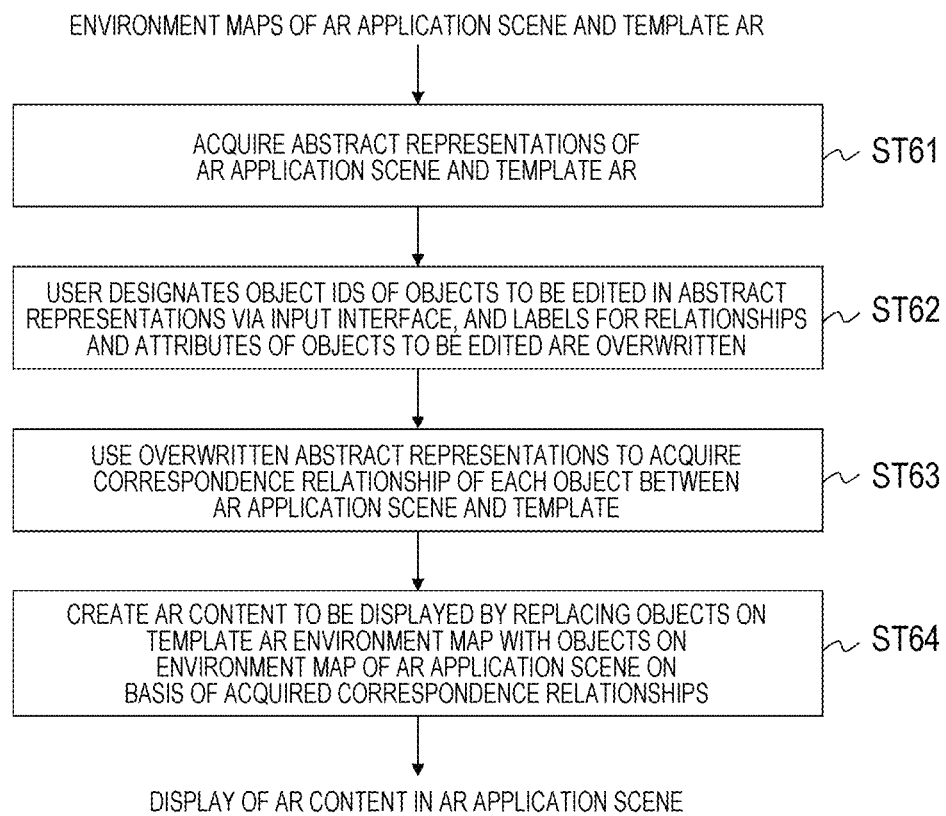
FIG. 11 is a flowchart illustrating an example of a processing procedure for mapping AR content via editing an abstract representation of a scene.

A flowchart in FIG. 11 illustrates an example of a processing procedure for mapping AR content via editing an abstract representation of a scene. In step ST61, the information processing apparatus 12 acquires abstract representations of an AR application scene and a template AR on the basis of environment maps of the AR application scene and the template AR.

Next, in step ST62, a user designates object IDs of objects to be edited in the abstract representations presented for comparison (presented in parallel) to the user by, for example, a video display unit via an input interface (user interface), and the information processing apparatus 12 overwrites labels for the relationships and attributes of the objects to be edited. This editing is performed on the abstract representation of the AR application scene or the template AR abstract representation, or on both. By this editing, for example, only one template AR abstract representation can be included in the abstract representation of the AR application scene.

Next, in step ST63, the information processing apparatus 12 uses the overwritten abstract representations to acquire a correspondence relationship of each object between the AR application scene and the template. Next, in step ST64, the information processing apparatus 12 creates AR content to be displayed by performing mapping, in which an object on the template AR environment map is replaced with an object on the environment map of the AR application scene, on the basis of the acquired correspondence relationships. This makes it possible to display the AR content in the AR application scene.

Figure 12:
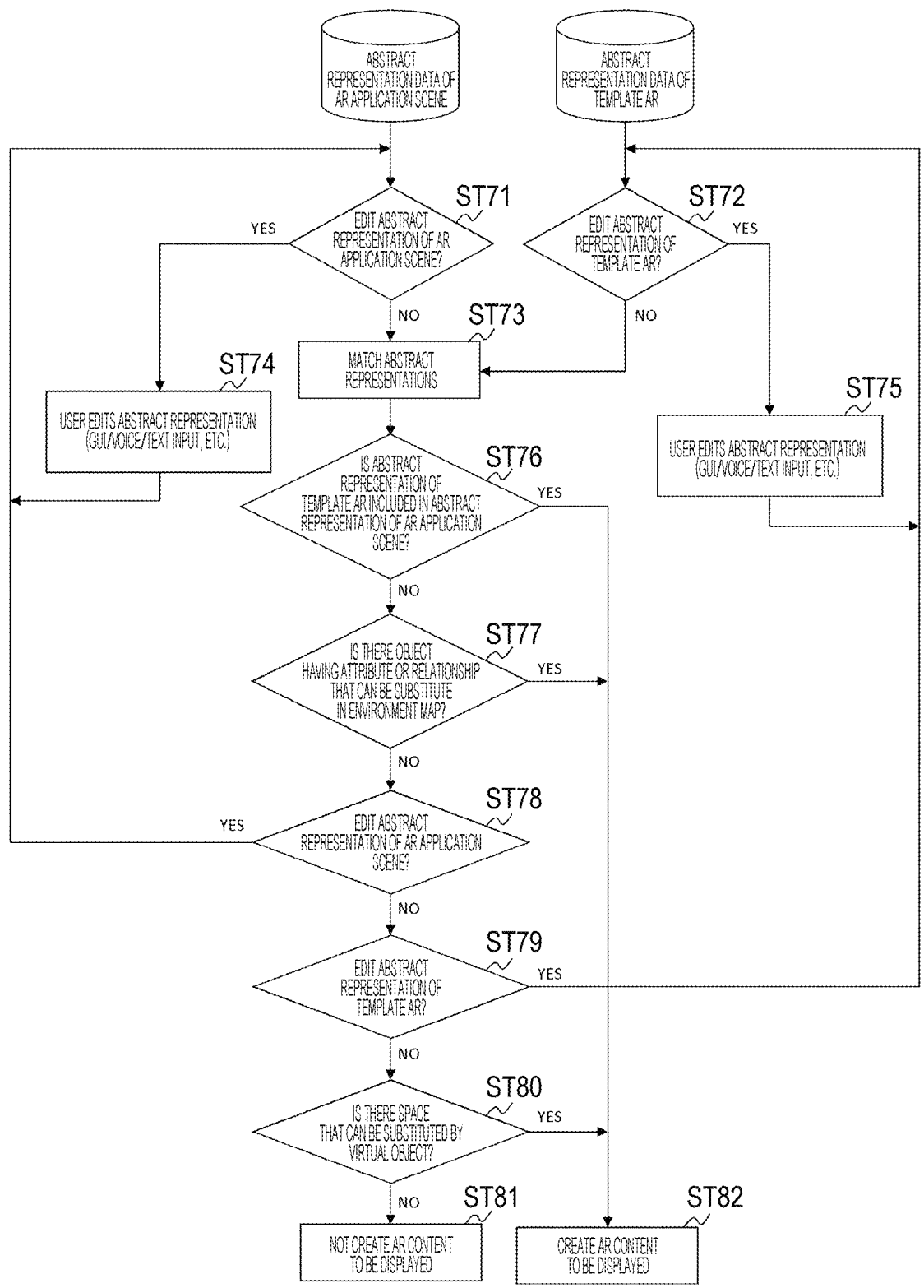
FIG. 12 is a flowchart illustrating an example of a processing procedure for editing processing.

A flowchart in FIG. 12 illustrates an example of a processing procedure for editing processing. Note that the step of each piece of processing is not necessarily limited to the order illustrated in FIG. 12.

When each of an abstract representation of an AR application scene and a template AR abstract representation has been input, a user can determine whether to directly use those abstract representations (steps ST71 and 72). In this case, for example, the abstract representation of the AR application scene and the template AR abstract representation are presented (displayed) to the user side by side. With this presentation, the user can easily and appropriately perform an operation of making a change to the abstract representations.

Furthermore, in this case, for example, when a plurality of partially isomorphic portions corresponding to the template AR abstract representation exists in the abstract representation of the AR application scene, the plurality of partially isomorphic portions is presented in such a manner as to be recognizable by the user. With this presentation, the user can easily recognize the plurality of partially isomorphic portions, and can efficiently perform an operation of making a change to the abstract representations for appropriately displaying the template augmented reality content in accordance with the user's intention.

When the abstract representations are directly used, the processing proceeds to processing of comparing the two abstract representations and solving for matching (step ST73). On the other hand, when the abstract representations are not directly used, the user can edit each abstract representation at this point of time (step ST74 and step ST75).

Figure 13B:
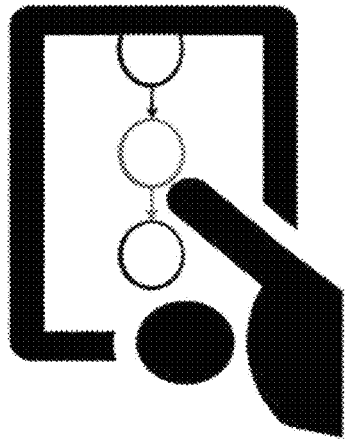
FIG. 13 is a diagram illustrating presentation of an interface for editing an abstract representation of an AR application scene.
Figure 13A:
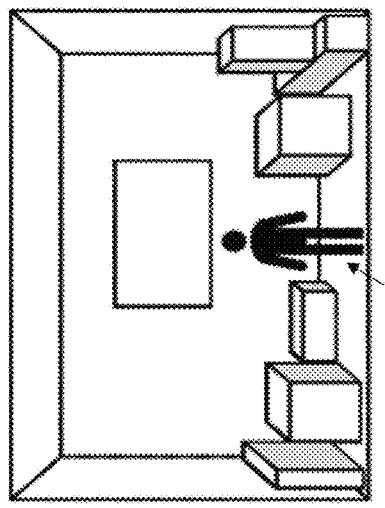

The editing of the abstract representations may be performed by a graph editing operation using a graphical user interface (GUI) that visualizes the state of the scene. This editing includes, for example, an operation of changing a relationship between nodes and an operation of changing an attribute of a node. FIG. 13 illustrates presentation of an interface for editing an abstract representation to a user in an AR application scene. FIG. 13(*a*) illustrates an example of an AR application scene, and FIG. 13(*b*) schematically illustrates an example of presenting a process of editing an abstract representation using a video display device (display, HMD, AR glasses, or the like).

In this case, the editing (e.g., deletion) may be performed by the user intuitively operating (e.g., an operation of touching an edge itself representing a relationship or an individual label) on an interface that visualizes an abstract representation of a scene presented by, for example, being projected on a display, an HMD, AR glasses, or a projector.

At this time, a presentation that is easy for the user to visually understand may be used. For example, a problem of matching the two may be solved in advance, and a place where graph structures do not match may be emphasized with color. Furthermore, a system that recognizes and inputs a text input or a voice uttered by the user may be provided for adding and editing labels such as a relationship between objects and an attribute of an object. Furthermore, the system may search for a substitute object on the basis of the abstract representation of the scene and present the object to the user.

After performing the processing of comparing the two abstract representations and solving for the matching in step ST73, the information processing apparatus 12 determines whether the template AR abstract representation is included in the abstract representation of the AR application scene, that is, whether the abstract representations are partially isomorphic (step ST76). When the template AR abstract representation is included in the abstract representation of the AR application scene, the information processing apparatus 12 proceeds to processing of creating AR content to be displayed (step ST82).

When the template AR abstract representation is not included in the abstract representation of the AR application scene in the processing of step ST76, the information processing apparatus 12 determines whether there is an object having an attribute or relationship that can be a substitute in the AR application scene environment map (step ST77). When there is an object having an attribute or relationship that can be a substitute in the AR application scene environment map, the information processing apparatus 12 proceeds to processing of creating AR content to be displayed (step ST82).

When there is no object having an attribute or relationship that can be a substitute in the AR application scene environment map in the processing of step ST77, the information processing apparatus 12 determines whether to edit the abstract representation of the AR application scene (step ST78). This determination is made on the basis of an editing instruction of the user. When the abstract representation of the AR application scene is to be edited, the information processing apparatus 12 returns to the processing of step ST71.

When the abstract representation of the AR application scene is not to be edited in the processing of step ST78, the information processing apparatus 12 determines whether to edit the template AR abstract representation (step ST79). This determination is made on the basis of an editing instruction of the user. When the template AR abstract representation is to be edited, the information processing apparatus 12 returns to the processing of step ST72.

When the abstract representation of the AR application scene is not edited in the processing of step ST79, the information processing apparatus 12 determines whether there is a space that can be substituted by a virtual object in the AR application scene (step ST80). When there is a space that can be substituted by a virtual object in the AR application scene, the information processing apparatus 12 proceeds to processing of creating the AR content to be displayed (step ST82).

When there is no space that can be substituted by a virtual object in the AR application scene in step ST80, the information processing apparatus 12 does not create AR content to be displayed (step ST81). In this case, the AR content based on the template AR content is not displayed in the AR application scene.

Figure 14:
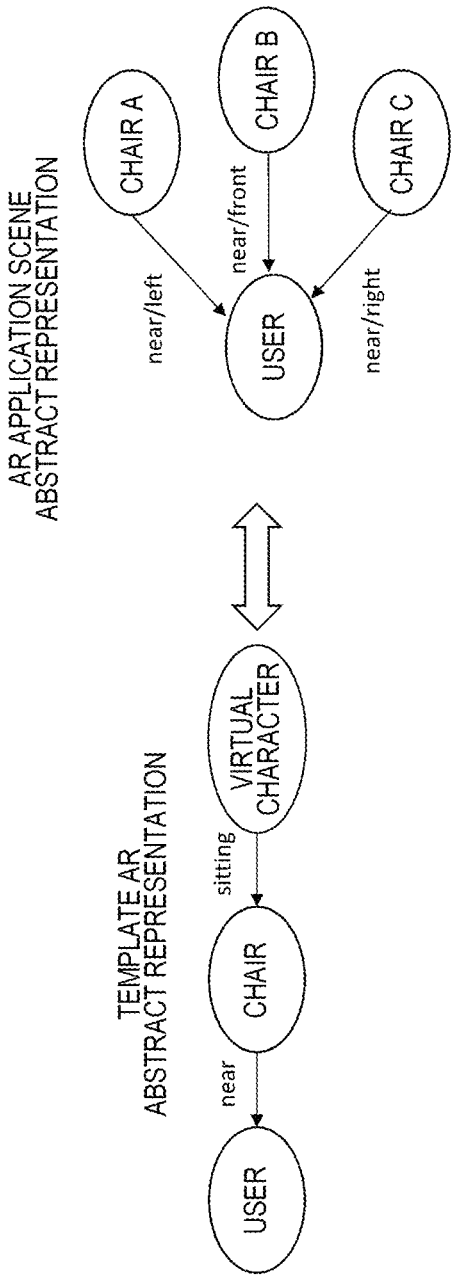
FIG. 14 is a diagram for illustrating an example of editing abstract representations of a template scene and an AR application scene.

An example of editing abstract representations of a template scene and an AR application scene will be described with reference to FIG. 14. This editing example shows a case where template AR content "a virtual character sits on a chair near a user" is displayed in a situation where there is a plurality of chair candidates. The left side of FIG. 14 illustrates a template AR abstract representation, and the right side of FIG. 14 illustrates an abstract representation of an AR application scene.

In the template AR abstract representation, there are three nodes, "user", "chair", and "virtual character". Then, the template AR abstract representation represents that the "chair" exists near the "user", and the "virtual character" is sitting on the "chair".

On the other hand, in the abstract representation of the AR application scene, there are four nodes, "user", "chair A", "chair B", and "chair C". Then, the "chair A" exists near on the left side of the "user", the "chair B" exists near in front of the "user", and the "chair C" exists near on the right side of the "user" in the representation.

In this case, there are three structures obtained by removing the "virtual character" from the template AR abstract representation in the abstract representation of the AR application scene. That is, the three structures are a portion of the "user" and the "chair A", a portion of the "user" and the "chair B", and a portion of the "user" and the "chair A".

In a case where no editing is performed in this state, in the mapping in the processing of generating AR content to be displayed described later, the virtual character is seated on a candidate selected on the basis of a condition set in advance by a content creator, context information of the scene, or the like. However, there is no guarantee that the selection result is as intended by the user, and the user cannot control the selection result unless the user knows the specific condition.

In this case, in the editing processing, it is possible to compare the abstract representation of the AR application scene and the template AR abstract representation, and perform an operation of making a change to the abstract representation of the AR application scene or the template AR abstract representation so that the virtual character can sit on a chair that is in accordance with the intention of the user.

FIG. 15(a) illustrates an example in which a change operation has been performed on a template AR abstract representation. In this case, in addition to "near", "front" has been added as a relationship of "chair" with respect to the "user". With this arrangement, the structure obtained by removing the "virtual character" from the template AR abstract representation corresponds to only the portion of the "user" and the "chair B" in the abstract representation of the AR application scene, and the virtual character can be seated on the chair B as intended by the user.

FIG. 15(b) illustrates an example in which a change operation has been performed on an abstract representation of an AR application scene. In this case, "near" has been deleted from "near" and "left side" as a relationship of "chair A" with respect to the "user", and "near" has been deleted from "near" and "right side" as a relationship of "chair C" with respect to the "user". With this arrangement, the structure obtained by removing the "virtual character" from the template AR abstract representation corresponds to only the portion of the "user" and the "chair B" in the abstract representation of the AR application scene, and the virtual character can be seated on the chair B as intended by the user.

Figure 16:
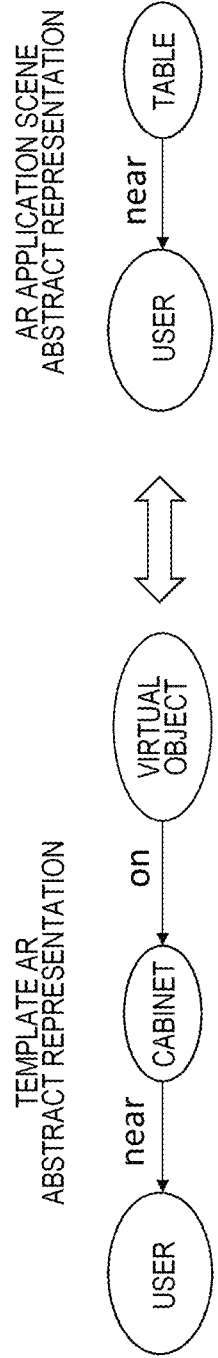
FIG. 16 is a diagram for illustrating another example of editing abstract representations of a template scene and an AR application scene.

Next, another example of editing abstract representations of a template scene and an AR application scene will be described with reference to FIG. 16. This editing example shows a case where template AR content "display a virtual object on a table near a user" is displayed in a situation where there is a cabinet instead of a table. The left side of FIG. 16 illustrates a template AR abstract representation, and the right side of FIG. 16 illustrates an abstract representation of an AR application scene.

In the template AR abstract representation, there are three nodes, "user", "cabinet", and "virtual object". Then, the template AR abstract representation represents that the "chair" exists near the "user", and the "virtual object" is displayed on the "cabinet". On the other hand, in the abstract representation of the AR application scene, there are two nodes, "user" and "table". Then, the "table" exists near the "user" in the representation.

In a case where no editing is performed in this state, in the processing of generating AR content to be displayed described later, the AR application scene is different from the situation assumed by the template AR content, and the template AR content cannot be directly mapped to the AR application scene.

In this case, a higher-order attribute (e.g., having a top surface on which an object can be placed) common to both of the abstract representations of the template scene and the AR application scene may be defined in advance and used for mapping.

Figure 17A:
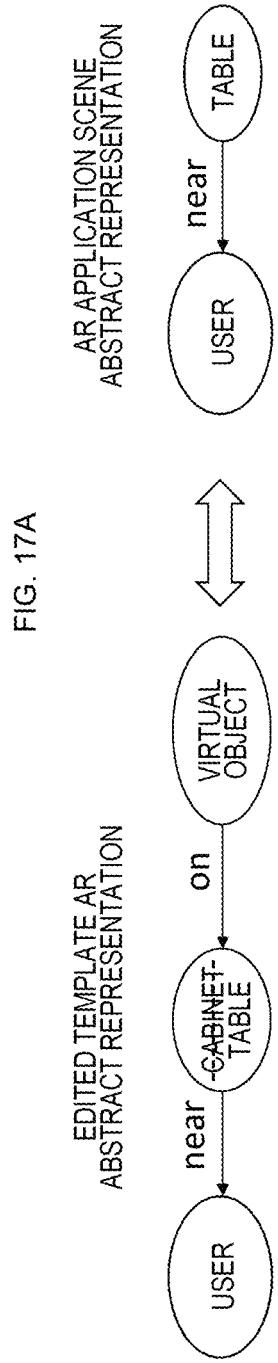
FIG. 17 is a diagram for illustrating another example of editing abstract representations of a template scene and an AR application scene.

FIG. 17(a) illustrates an example in which a change operation has been performed on a template AR abstract representation. In this case, the "cabinet" in the template AR abstract representation has been changed to an attribute "table". With this arrangement, the structure obtained by removing the "virtual object" from the template AR abstract representation is in a state corresponding to the portion of the "user" and the "table" in the abstract representation of the AR application scene, and the template AR content can be mapped to the AR application scene.

Figure 17B:
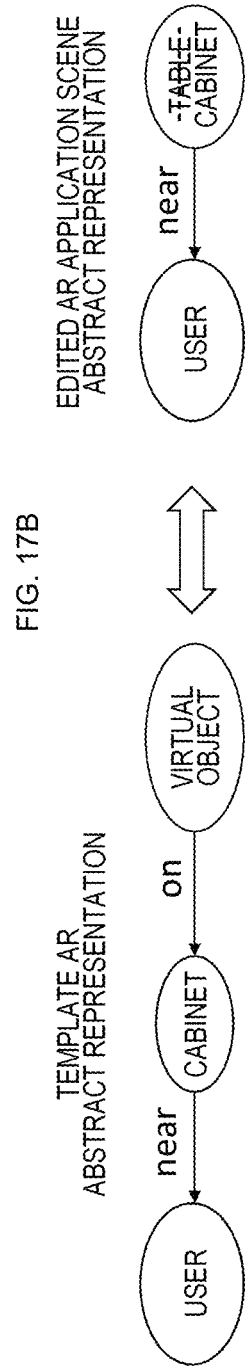

FIG. 17(b) illustrates an example in which a change operation has been performed on an abstract representation of an AR application scene. In this case, the "table" in the abstract representation of the AR application scene has been changed to an attribute "cabinet". With this arrangement, the structure obtained by removing the "virtual object" from the template AR abstract representation is in a state corresponding to the portion of the "user" and the "cabinet" in the abstract representation of the AR application scene, and the template AR content can be mapped to the AR application scene.

Returning to the description of FIG. 6, in step ST14, AR content to be displayed is generated on the basis of the abstract representations of the template AR and the AR application scene after being subjected to the editing processing in step ST13, the environment map of the AR application scene, the template AR environment map, and the template AR content. The AR content to be displayed is generated by comparing the template AR abstract representation with the abstract representation of the AR application scene and performing mapping in which an object on the template AR environment map is replaced with an object on the environment map of the AR application scene on the basis of a result of the comparison (correspondence relationship).

Figure 18:
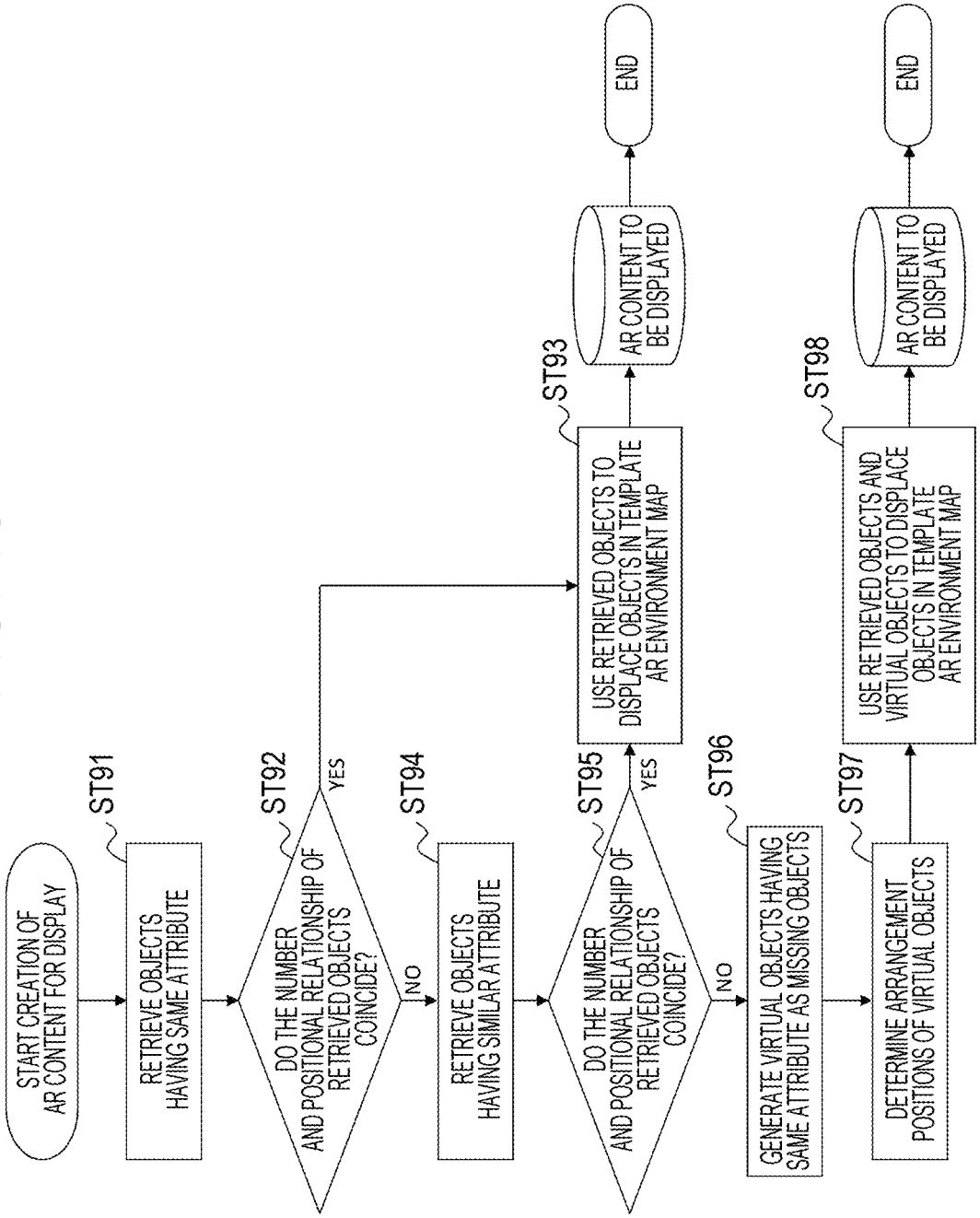
FIG. 18 is a flowchart illustrating an example of a processing procedure for processing of generating AR content to be displayed.

A flowchart in FIG. 18 illustrates an example of a processing procedure for processing of generating AR content to be displayed. In step ST91, from objects OT_i that exist in an AR application scene represented by an abstract representation of an AR application scene, the information processing apparatus 12 retrieves objects OT_i having the same attribute X_i as objects OS_i represented by a template AR abstract representation.

In step ST92, the information processing apparatus 12 determines whether or not the quantity of the retrieved objects OT_i and the relative positional relationship of the objects OT_i coincide with the quantity of objects OS_i having the attribute X_i and the relative positional relationship of the objects OS_i represented by the template AR abstract representation, respectively.

Here, when the same quantity of objects having the same attribute exist in each of the template scene and the AR application scene, and the positional relationship of the objects having the same attribute in the template scene is the same as the positional relationship in the AR application scene, it is determined that a condition is satisfied. The positional relationships between the objects do not need to be completely the same, and it may be determined that the condition is satisfied when the positional relationships have a similarity equal to or higher than a threshold.

When it is determined in step ST92 that the quantity and the relative positional relationship of the retrieved objects OT_i coincide with the quantity and the relative positional relationship of the objects OS_i, respectively, the information processing apparatus 12 proceeds to the processing of step ST93.

In step ST93, the information processing apparatus 12 generates AR content to be displayed by displacing the positions of the objects based on the positions of the objects OS_i in the template AR content to positions based on the positions of the objects OT_i. The positional relationship between the object and the objects OT_i in the AR content to be displayed is the same as the positional relationship between the object and the objects OS_i in the template AR content.

FIG. 19 illustrates an example of a template AR environment map, an AR application scene environment map, and AR content to be displayed. Note that, here, it is assumed that the environment maps of the template AR and the AR application scene correspond to the abstract representations after being subjected to the editing processing.

The template AR environment map illustrated in an upper part of FIG. 19 represents the template scene illustrated in FIG. 4 in which there is one table and four chairs on a floor surface, and the four chairs surround the table. Furthermore, the AR application scene environment map illustrated in a middle part of FIG. 19 represents the AR application scene illustrated in FIG. 2 in which there is one table and four chairs on a floor surface, and the four chairs surround the table.

When such a template AR environment map has been prepared, the object OT11 (FIG. 2) having the same attribute "table" as the object OS11 (FIG. 4) is retrieved as the object OT_i having the same attribute X_i as the object OS_i. Furthermore, each of the object OT21 having the same attribute "chair" as the object OS21, the object OT22 having the same attribute "chair" as the object OS22, the object OT23 having the same attribute "chair" as the object OS23, and the object OT24 having the same attribute "chair" as the object OS24 is retrieved.

Furthermore, it is determined that the quantities of the object OS11 (table) and the objects OS21 to OS24 (chairs) and the positional relationship of each object in the template scene are the same as the quantities of the object OT11 (table) and the objects OT21 to OT24 (chairs) and the positional relationship of each object in the AR application scene.

FIG. 20 is a diagram illustrating an example of positional relationships between objects in a template AR environment map and an AR application scene environment map. The positional relationship between the object OS11 and the objects OS21 to OS24 in the template scene represented by the template AR environment map is as illustrated on the left side of FIG. 20. On the other hand, the positional relationship between the object OT11 and the objects OT21 to OT24 in the AR application scene represented by the AR application scene environment map is as illustrated on the right side of FIG. 20. Note that, in FIG. 20, arrows shown in the vicinity of the objects OS21 to OS24 and the objects OT21 to OT24 indicate the orientations of the chairs.

The positional relationship between the object OS11 and the objects OS21 to OS24 in the template scene is the same as the positional relationship between the object OT11 and the objects OT21 to OT24 in the AR application scene in that there are four chairs at positions surrounding an object having the same attribute "table".

In this case, as illustrated in a lower part of FIG. 19, AR content to be displayed that achieves the way four different characters look as if the characters are seated, one on each of the four chairs surrounding the table is generated on the basis of the template AR content. Here, the chairs used for seating the four characters are the objects OT21 to OT24 that exist in the AR application scene.

FIG. 21 is a diagram illustrating an example of displacing a position of an object in template AR content. When each object has the positional relationship illustrated in FIG. 20, the position of the character C1 seated on the object OS21 in the template AR content is displaced to the position of the object OT21 as indicated by an arrow A101 in FIG. 21. In FIG. 21, the position of each character is represented by a circle with a predetermined pattern. In the template AR content, the position of the character C1 is set on the basis of the positions of the object OS11 and the object OS21. The same positional relationship is maintained on the basis of the positions of the object OT11 and the object OT21.

Similarly, the position of the character C2 seated on the object OS22 in the template AR content is displaced to the position of the object OT22 as indicated by an arrow A102. Furthermore, the position of the character C3 seated on the object OS23 in the template AR content is displaced to the position of the object OT23 as indicated by an arrow A103. The position of the character C4 seated on the object OS24 in the template AR content is displaced to the position of the object OT24 as indicated by an arrow A104.

The AR content to be displayed that has been generated by displacing the positions in this way is reproduced, and thus the way the characters C1 to C4 look as described with reference to FIG. 3 is achieved.

Returning to the description of FIG. 18, when it is determined in step ST92 that the quantity and the relative positional relationship of the retrieved objects OT_i do not coincide with the quantity and the relative positional relationship of the objects OS_i, respectively, the information processing apparatus 12 proceeds to the processing of step ST94.

In step ST94, from the objects OT_i that exist in the AR application scene represented by the abstract representation of the AR application scene, the information processing apparatus 12 retrieves an object OT'_i having an attribute X'_i similar to that of the objects OS_i represented by the template AR abstract representation.

The attribute X'_i similar to the attribute X_i is defined in advance in a table or the like at the time of generating the template AR content, for example. The attribute X'_i may be designated by the user at the time of generating the AR content to be displayed.

In step ST95, the information processing apparatus 12 determines whether or not the quantity of the objects OT_i and the relative positional relationship of the objects OT_i including the retrieved object OT'_i coincide with the quantity of objects OS_i having the attribute X_i and the relative positional relationship of the objects OS_i represented by the template AR abstract representation, respectively.

Here, when the same quantity of objects having the same attribute including objects having similar attributes exist in each of the template scene and the AR application scene, and the positional relationship of each object in the template scene is the same as the positional relationship in the AR application scene, it is determined that the condition is satisfied.

When it is determined in step ST95 that the quantity and the relative positional relationship of the objects OT_i coincide with the quantity and the relative positional relationship of the objects OS_i, respectively, the information processing apparatus 12 proceeds to the processing of step ST93.

In step ST93, similarly to the above-described processing, the positions of the objects based on the positions of the objects OS_i in the template AR content are displaced to positions based on the positions of the objects OT_i, and thus AR content to be displayed is generated.

FIG. 22 illustrates an example of a template AR environment map, an AR application scene environment map, and AR content to be displayed. Note that, here, it is assumed that the environment maps of the template AR and the AR application scene correspond to the abstract representations after being subjected to the editing processing.

The template AR environment map illustrated in an upper part of FIG. 22 represents the template scene illustrated in FIG. 4 in which there is one table and four chairs on a floor surface, and the four chairs surround the table. Furthermore, the AR application scene environment map illustrated in a middle part of FIG. 22 represents a scene in which there is a floor surface, and there is one table, four chairs, and one sofa on the floor surface. In this example, three of the four chairs surround the table, but one chair is located at a position away from the table. Furthermore, the one sofa is assumed to be in the vicinity of the table.

When such a template AR environment map has been prepared, the object OT11 having the same attribute "table" as the object OS11 (FIG. 4) is retrieved as the object OT_i having the same attribute X_i as the object OS_i. Furthermore, each of the object OT21 having the same attribute "chair" as the object OS21, the object OT22 having the same attribute "chair" as the object OS22, the object OT23 having the same attribute "chair" as the object OS23, and the object OT24 having the same attribute "chair" as the object OS24 is retrieved.

Furthermore, it is determined that the quantities of the object OS11 (table) and the objects OS21 to OS24 (chairs) and the positional relationship of each object in the template scene are not the same as the quantities of the object OT11 (table) and the objects OT21 to OT24 (chairs) and the positional relationship of each object in the AR application scene.

Figure 23:
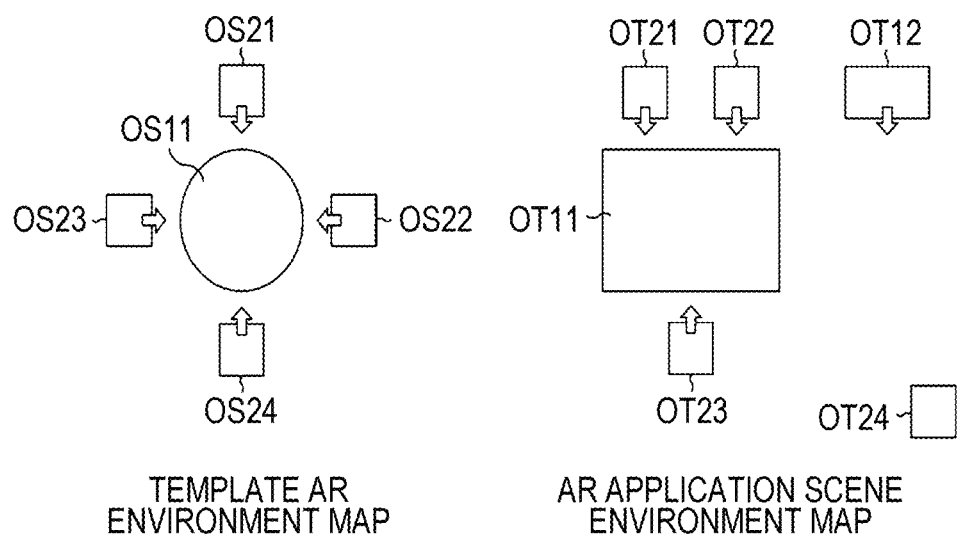
FIG. 23 is a diagram illustrating an example of positional relationships between objects in a template AR environment map and an AR application scene environment map.

FIG. 23 is a diagram illustrating an example of positional relationships between objects in a template AR environment map and an AR application scene environment map. The positional relationship between the object OS11 and the objects OS21 to OS24 in the template scene represented by the template AR environment map illustrated on the left side of FIG. 23 is the same as the positional relationship described with reference to FIG. 20. On the other hand, the positional relationship between the object OT11 and the objects OT21 to OT24 in the AR application scene represented by the AR application scene environment map is as illustrated on the right side of FIG. 23. In the AR application scene, there is also the object OT12, which is a sofa.

The positional relationship between the object OS11 and the objects OS21 to OS24 in the template scene is not the same as the positional relationship between the object OT11 and the objects OT21 to OT24 in the AR application scene in that the object OT24, which is one "chair", is located at a position at a distance. In this case, the object OT12 having an attribute "sofa", which is an attribute similar to "chair", is retrieved from the objects OT_i that exist in the AR application scene represented by the AR application scene environment map.

Furthermore, it is determined that the quantities of the object OS11 (table) and the objects OS21 to OS24 (chairs) and the positional relationship of each object in the template scene are the same as the quantities of the object OT11 (table), the objects OT21 to OT23 (chairs), and the object OT12 (sofa) and the positional relationship of each object, including the object OT12, in the AR application scene.

In this case, as illustrated in a lower part of FIG. 22, AR content to be displayed that achieves the way four different characters look as if the characters are seated, one on each of the three chairs surrounding the table and the sofa in the vicinity of the table is generated on the basis of the template AR content. Here, the chairs used for seating the four characters are the objects OT21 to OT23 and the object OT12 that exist in the actual scene.

Figure 24:
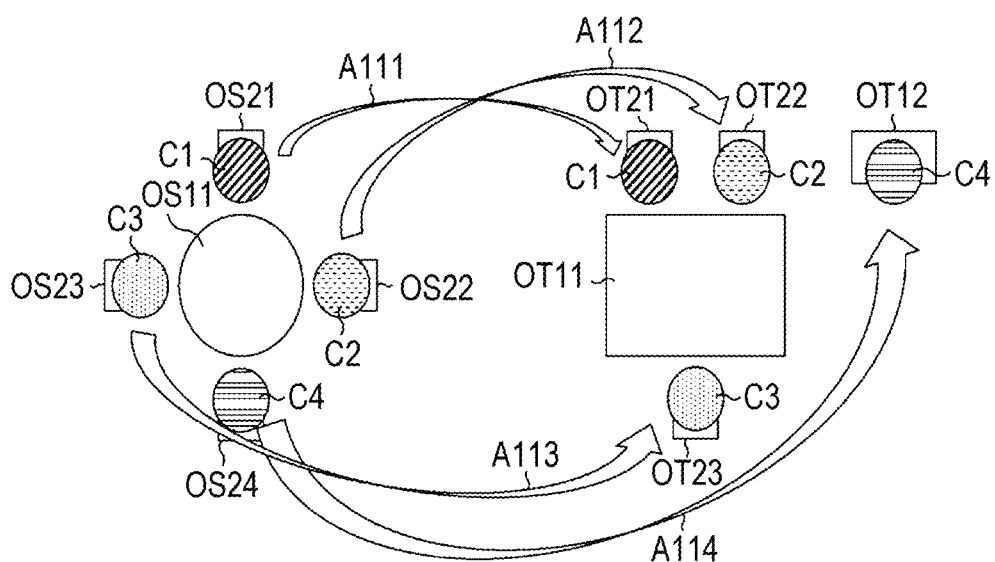
FIG. 24 is a diagram illustrating an example of displacing a position of an object in template AR content.

FIG. 24 is a diagram illustrating an example of displacing a position of an object in template AR content. When each object has the positional relationship illustrated in FIG. 23, the position of the character C1 seated on the object OS21 in the template AR content is displaced to the position of the object OT21 as indicated by an arrow A111 in FIG. 24.

Similarly, the position of the character C2 seated on the object OS22 in the template AR content is displaced to the position of the object OT22 as indicated by an arrow A112. The position of the character C3 seated on the object OS23 in the template AR content is displaced to the position of the object OT23 as indicated by an arrow A113. Furthermore, the position of the character C4 seated on the object OS24 in the template AR content is displaced to the position of the object OT12, which is a sofa, as indicated by an arrow A114.

As described above, when there is no object having the same attribute as an object that exists in the template scene, the position of a character is displaced with the use of an object having a similar attribute. This makes it possible to apply the template AR content to the actual scene even when an object completely the same as an object existing in the template scene does not exist in the AR application scene.

Returning to the description of FIG. 18, when it is determined in step ST95 that the quantity and the relative positional relationship of the retrieved objects OT_i do not coincide with the quantity and the relative positional relationship of the objects OS_i, respectively, the information processing apparatus 12 proceeds to the processing of step ST96. In this case, even in a case where objects having similar attributes are included, the AR application scene does not include objects that are the same in quantity and positional relationship as the objects that exist in the template scene.

In step ST96, the information processing apparatus 12 generates objects C_j (virtual objects) in a quantity equal to the quantity of the missing objects, the objects C_j having the same attribute X_i as the objects OS_i represented by the template AR abstract representation. If there is a missing object having the attribute "chair" in the AR application scene, an object having the attribute "chair" is generated. Instead of an object having the same attribute, an object having a similar attribute may be generated.

In step ST97, the information processing apparatus 12 determines the arrangement positions of the objects C_j such that the relative positional relationship between the objects OT_i that exist in the AR application scene and the newly generated objects C_j coincides with the positional relationship of the objects OS_i in the template scene. Here, the objects OT_i also include the object OT'_i retrieved in step ST94.

In step ST98, the information processing apparatus 12 generates AR content to be displayed by displacing the positions of the objects based on the positions of the objects OS_i in the template AR content to positions based on the positions of the objects OT_i and the objects C_j.

FIG. 25 illustrates an example of a template AR environment map, an AR application scene environment map, and AR content to be displayed. Note that, here, it is assumed that the environment maps of the template AR and the AR application scene correspond to the abstract representations after being subjected to the editing processing.

The template AR environment map illustrated in an upper part of FIG. 25 represents the template scene illustrated in FIG. 4 in which there is one table and four chairs on a floor surface, and the four chairs surround the table. Furthermore, the AR application scene environment map illustrated in a middle part of FIG. 25 represents a scene in which there is a floor surface, and there is one table and three chairs on the floor surface. In this example, the three chairs are assumed to surround the table.

When such a template AR environment map has been prepared, the object OT11 having the same attribute "table" as the object OS11 (FIG. 4) is retrieved as the object OT_i having the same attribute X_i as the object OS_i. Similarly, each of the object OT21 having the same attribute "chair" as the object OS21, the object OT22 having the same attribute "chair" as the object OS22, and the object OT23 having the same attribute "chair" as the object OS23 is retrieved.

Furthermore, it is determined that the quantities of the object OS11 (table) and the objects OS21 to OS24 (chairs) and the positional relationship of each object in the template scene are not the same as the quantities of the object OT11 (table) and the objects OT21 to OT23 (chairs) and the positional relationship of each object in the actual scene. In the AR application scene, one of the chairs is missing.

FIG. 26 is a diagram illustrating an example of positional relationships between objects in a template AR environment map and an AR application scene environment map. The positional relationship between the object OS11 and the objects OS21 to OS24 in the template scene represented by the template AR environment map illustrated on the left side of FIG. 26 is the same as the positional relationship described with reference to FIGS. 20 and 23. On the other hand, the positional relationship between the object OT11 and the objects OT21 to OT23 in the AR application scene represented by the AR application scene environment map is as illustrated on the right side of FIG. 26.

The positional relationship between the object OS11 and the objects OS21 to OS24 in the template scene is not the same as the positional relationship between the object OT11 and the objects OT21 to OT23 in the actual scene in that one "chair" is missing. In this case, an object C11 having the attribute "chair" is generated.

Furthermore, as indicated by a broken line, the arrangement position of the object C11 is determined so that the positional relationship is the same as the positional relationship between the object OS11 and the objects OS21 to OS24 in the template scene. The positional relationship between the object OT11, the objects OT21 to OT23, and the object C11 in the AR application scene illustrated on the right side of FIG. 26 is the same as the positional relationship between the object OS11 and the objects OS21 to OS24 in the template scene.

In this case, as illustrated in a lower part of FIG. 25, AR content to be displayed that achieves the way four characters look as if the characters are seated, one on each of the three chairs surrounding the table and a virtual chair is generated on the basis of the template AR content. Here, the chairs used for seating the four characters are the objects OT21 to OT23 that exist in the actual scene and the virtual object C11. The AR content to be displayed also includes video data for displaying the object C11.

Figure 27:
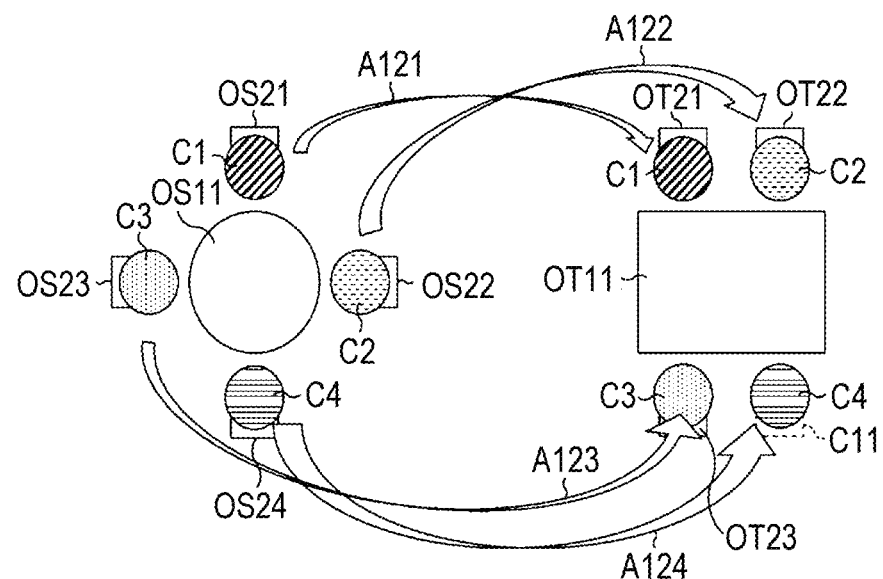
FIG. 27 is a diagram illustrating an example of displacing a position of an object in template AR content.

FIG. 27 is a diagram illustrating an example of displacing a position of an object in template AR content. When each object has the positional relationship illustrated in FIG. 26, the position of the character C1 seated on the object OS21 in the template AR content is displaced to the position of the object OT21 as indicated by an arrow A121 in FIG. 27.

Similarly, the position of the character C2 seated on the object OS22 in the template AR content is displaced to the position of the object OT22 as indicated by an arrow A122. The position of the character C3 seated on the object OS23 in the template AR content is displaced to the position of the object OT23 as indicated by an arrow A123. Furthermore, the position of the character C4 seated on the object OS24 in the template AR content is displaced to the position of the object C11 as indicated by an arrow A124.

As described above, when any of the objects that exist in the actual scene is missing, the position of a character is displaced with the use of a virtual object. This makes it possible to apply the template AR content to the actual scene even when an object completely the same as an object existing in the template scene does not exist in the actual scene.

Returning to the description of FIG. 18, after the AR content to be displayed has been generated in step ST93 or step ST98, the processing ends.

Returning to the description of FIG. 6, in step ST15, the position and posture of the user in the AR application scene represented by the environment map of the AR application scene is estimated on the basis of the AR application scene information (environment data) and the environment map of the AR application scene generated in step ST11. For example, the position and posture of the AR glasses 11 as a display device are estimated as the position and posture of the user.

In step ST16, the AR content to be displayed is reproduced, and the AR content in accordance with the position and posture estimated in step ST15 is displayed. The video data in accordance with the position and posture of the user is transmitted from the information processing apparatus 12 to the AR glasses 11, and the video is displayed so as to be superimposed on the AR application scene.

AR content to be displayed is generated by the processing in the flowchart in FIG. 6 as described above, and thus the following effects are obtained. That is, when the AR content to be displayed is generated, a comparison between abstract representations is performed, and the calculation processing for mapping the template AR content to the AR application scene is reduced and simplified as compared with a case of performing a comparison between environment maps.

Furthermore, the abstract representation of the AR application scene or the template AR abstract representation is edited, and this makes it possible to appropriately display the template AR content in accordance with the user's intention when the template AR content is experienced in the AR application scene of each individual user. It is also possible to increase the range of user's scenes (AR application scenes) in which the template AR content can be experienced.

"Configuration of AR Glasses"

Figure 28:
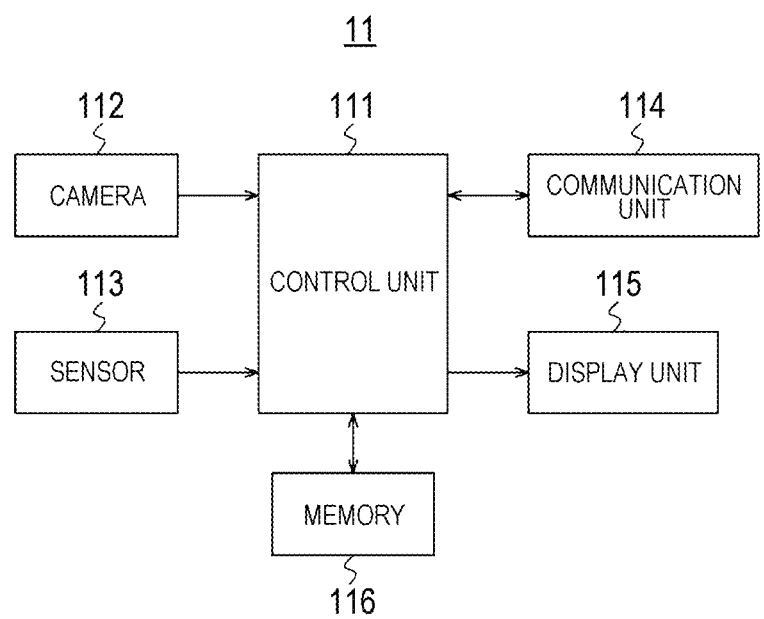
FIG. 28 is a block diagram illustrating a configuration example of AR glasses.

FIG. 28 illustrates a configuration example of the AR glasses 11. The AR glasses 11 include a control unit 111, a camera 112, a sensor 113, a communication unit 114, a display unit 115, and a memory 116.

The control unit 11 is constituted by a central processing unit (CPU), a read only memory (ROM), a random access memory (RAM), and the like. The control unit 111 executes a program stored in the ROM or the memory 116 to control the entire operation of the AR glasses 11.

When AR content is reproduced, the control unit 111 generates AR application scene information (environment data) on the basis of an RGB image captured by the camera 112 and a result of measurement by the sensor 113, and causes the communication unit 114 to transmit the AR application scene information to the information processing apparatus 12. Furthermore, when the information processing apparatus 12 has reproduced the AR content to be displayed and the communication unit 114 has received video data of the AR content, the control unit 111 outputs a video based on the video data to the display unit 115 so that the video is displayed.

The camera 112 images a scenery in front of a user at a predetermined timing such as at the time of reproduction of AR content. Then, the camera 112 outputs an RGB image obtained by capturing an image to the control unit 111.

The sensor 113 is constituted by a depth sensor, LiDAR, or the like. The depth sensor or the LiDAR constituting the sensor 113 measures the distance to each position constituting the AR application scene (actual scene), and outputs, to the control unit 111, a range image, point cloud data, and the like as data representing the measurement result.

The sensor 113 includes, as appropriate, various sensors such as an acceleration sensor, a gyro sensor, and a positioning sensor. In this case, results of measurement by the acceleration sensor, the gyro sensor, and the positioning sensor are included in the environment data and output to the information processing apparatus 12. The results of measurement by the acceleration sensor, the gyro sensor, and the positioning sensor are used to estimate the position and posture of the user or the like.

The communication unit 114 is constituted by a communication module such as a wireless LAN. The communication unit 114 communicates with the information processing apparatus 12 via the network 13, and transmits the environment data supplied from the control unit 111 to the information processing apparatus 12. Furthermore, the communication unit 114 receives the video data transmitted from the information processing apparatus 12 and outputs the video data to the control unit 111.

The display unit 115 displays the video of the AR content on the basis of the video data supplied from the control unit 111. The memory 116 is a storage medium such as a flash memory. The memory 116 stores various types of data such as a program to be executed by the CPU of the control unit 111.

"Configuration of Information Processing Apparatus"

Figure 29:
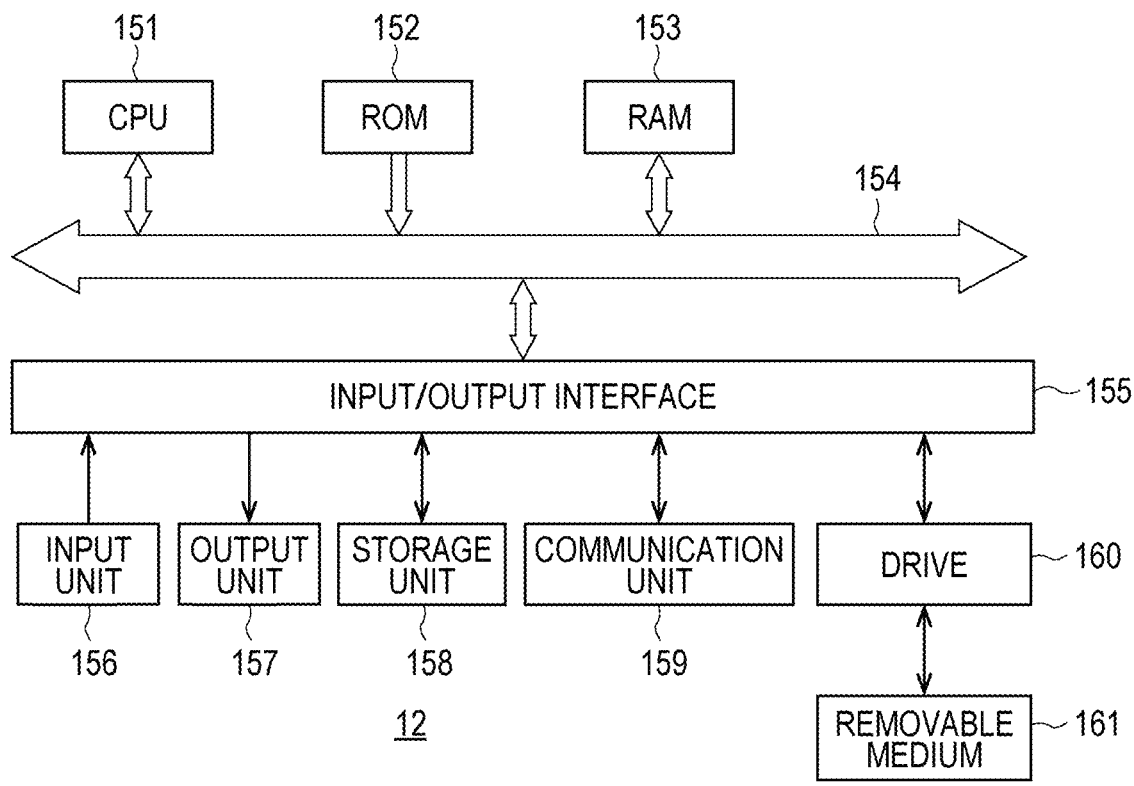
FIG. 29 is a block diagram illustrating a configuration example of an information processing apparatus.

FIG. 29 illustrates a configuration example of the information processing apparatus 12. A CPU 151, a ROM 152, and a RAM 153 are connected to each other by a bus 154.

The bus 154 is further connected with an input/output interface 155. The input/output interface 155 is connected with an input unit 156 constituted by a keyboard, a mouse, or the like, and an output unit 157 constituted by a display, a speaker, or the like. Furthermore, the input/output interface 155 is connected with a storage unit 158 constituted by a hard disk, a non-volatile memory, or the like, a communication unit 159 constituted by a network interface or the like, and a drive 160 that drives a removable medium 161.

"Functional Configuration of Information Processing Apparatus"

Figure 30:
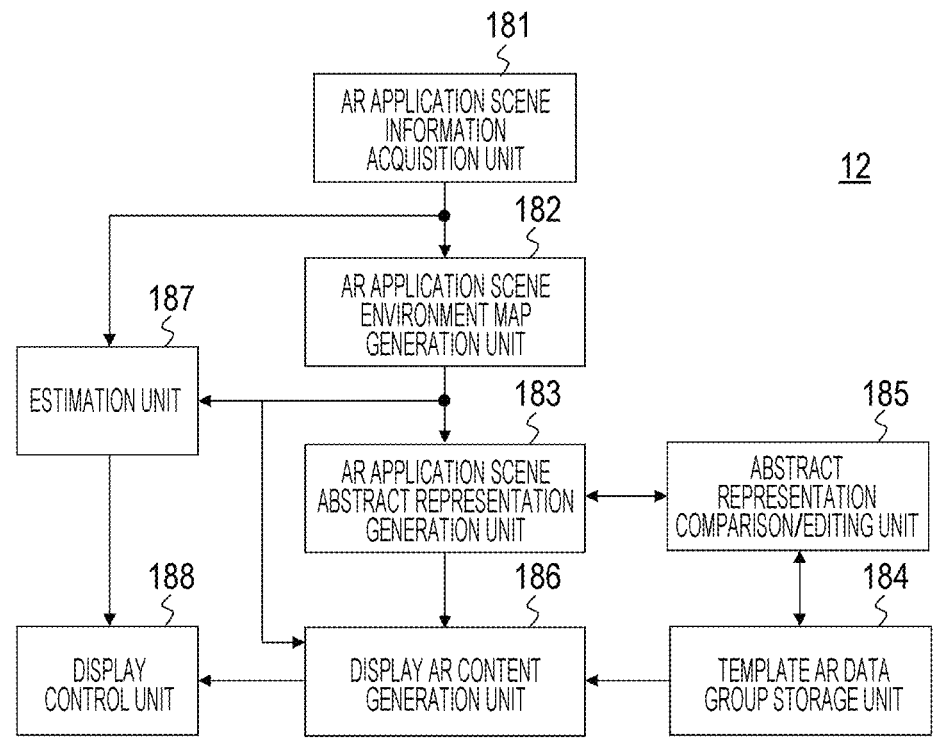
FIG. 30 is a block diagram illustrating a functional configuration example of the information processing apparatus.

FIG. 30 illustrates a functional configuration example of the information processing apparatus 12. In the information processing apparatus 12, the CPU 151 in FIG. 29 executes a predetermined program to enable each functional unit.

The information processing apparatus 12 includes an AR application scene information acquisition unit 181, an AR application scene environment map generation unit 182, an AR application scene abstract representation generation unit 183, a template AR data group storage unit 184, an abstract representation comparison/editing unit 185, a display AR content generation unit 186, an estimation unit 187, and a display control unit 188.

The AR application scene information acquisition unit 181 acquires AR application scene information (environment data) transmitted from the AR glasses 11 at the time of reproduction of the AR content and received by the communication unit 159. The AR application scene information acquired by the AR application scene information acquisition unit 181 is supplied to the AR application scene environment map generation unit 182 and the estimation unit 187.

The AR application scene environment map generation unit 182 generates an environment map (real environment map) of the AR application scene on the basis of the AR application scene information supplied from the AR application scene information acquisition unit 181. The processing of step ST11 in FIG. 6 is the processing performed by the AR application scene environment map generation unit 182. The environment map of the AR application scene generated by the AR application scene environment map generation unit 182 is supplied to the AR application scene abstract representation generation unit 183 and the estimation unit 187, and also to the display AR content generation unit 186.

The AR application scene abstract representation generation unit 183 generates an abstract representation of the AR application scene on the basis of the environment map of the AR application scene supplied from the AR application scene environment map generation unit 182. The processing of step ST12 in FIG. 6 is the processing performed by the AR application scene abstract representation generation unit 183.

The template AR data group storage unit 184 stores a template AR data group. That is, the template AR data group storage unit 184 stores a predetermined number of pieces of template AR data generated in advance by the information processing apparatus 12 or another information processing apparatus. As illustrated in FIG. 6, each piece of template AR data includes a template AR environment map, a template AR abstract representation, and template AR content.

The abstract representation comparison/editing unit 185 presents for comparison (presents in parallel), to a user, the abstract representation of the AR application scene generated by the AR application scene abstract representation generation unit 183 and the template AR abstract representation corresponding to the template AR content used in the AR application scene, and makes a change to the abstract representations in response to a change operation by the user from the user interface. The processing of step ST13 in FIG. 6 is the processing performed by the abstract representation comparison/editing unit 185.

The display AR content generation unit 186 acquires the abstract representation of the AR application scene from the AR application scene abstract representation generation unit 183, and also acquires, from the template AR data group storage unit 184, the template AR content corresponding to the template AR content used in the AR application scene and the abstract representation of the template AR content. The abstract representations have been subjected to the editing processing in step ST13, and have been changed as necessary. Furthermore, the display AR content generation unit 186 acquires the environment map of the AR application scene from the AR application scene environment map generation unit 182, and also acquires, from the template AR data group storage unit 184, the template AR environment map corresponding to the template AR content used in the AR application scene.

The display AR content generation unit 186 generates AR content to be displayed on the basis of each piece of the acquired information. The AR content to be displayed is generated by comparing the template AR abstract representation with the abstract representation of the AR application scene and performing mapping in which an object on the template AR environment map is replaced with an object on the environment map of the AR application scene on the basis of a result of the comparison (correspondence relationship). The processing of step ST14 in FIG. 6 is the processing performed by the display AR content generation unit 186. The AR content to be displayed that has been generated by the display AR content generation unit 186 is supplied to the display control unit 188.

The estimation unit 187 estimates the position and posture of the user in the AR application scene on the basis of the AR application scene information (environment data) supplied from the AR application scene information acquisition unit 181 and the environment map (real environment map) of the AR application scene supplied from the AR application scene environment map generation unit 182. The processing of step ST15 in FIG. 6 is the processing performed by the estimation unit 187. Information representing a result of the estimation by the estimation unit 187 is supplied to the display control unit 188.

The display control unit 188 reproduces the AR content to be displayed supplied from the display AR content generation unit 186, and generates video data in accordance with the position and posture estimated by the estimation unit 187. The processing of step ST16 in FIG. 6 is the processing performed by the display control unit 188. The display control unit 188 controls the communication unit 159 (see FIG. 29) to transmit the video data to the AR glasses 11, and causes the AR glasses 11 to display the video of the AR content to be displayed.

"Processing Example Regarding Mapping of Template AR Content Using Abstract Representation of Scene"

A processing example related to mapping of template AR content using an abstract representation of a scene will be described. Here, a series of processing will be described in which template AR content "when a user is sitting on a sofa and watching television, a virtual character sits on a chair near the user" is assumed, and the template AR content is mapped with the use of an abstract representation of a scene.

"Template AR Content and Abstract Representation Thereof"

Figure 31A:
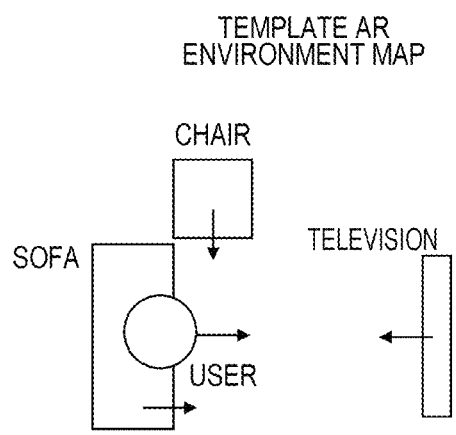
FIG. 31 is a diagram illustrating an example of a template environment map (map A) and a template AR abstract representation.
Figure 31B:
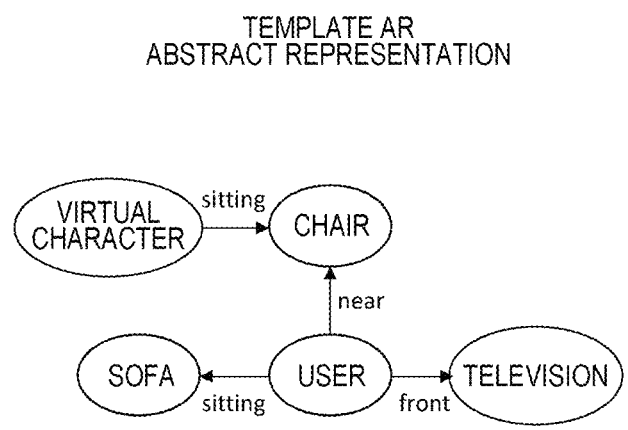

Consideration will be given to a template AR environment map (hereinafter referred to as a "map A") in which a chair, a sofa, a television, and a user are arranged in a positional relationship (a diagram viewed from directly above) as illustrated in FIG. 31(*a*), on the assumption of template AR content "when a user is sitting on a sofa and watching television (facing the television), a virtual character sits on a chair near the user".

The template AR environment map includes three-dimensional geometric information of each object, semantic information such as attributes, and information regarding a relative three-dimensional positional relationship. At this time, by extracting a relationship between the objects from the information included in the map A and combining the relationship with the information of the template AR content, it is possible to define a template AR abstract representation for content mapping as illustrated in FIG. 31(*b*).

Figure 32:
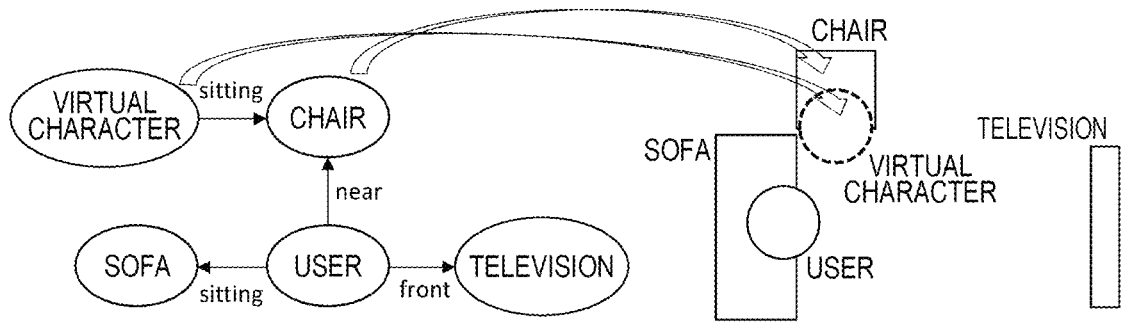
FIG. 32 is a diagram illustrating an example of mapping of template AR content based on a template AR abstract representation.

In this template AR abstract representation, the virtual character and the chair are connected by a relationship "sitting", which indicates the relationship after the content mapping. When content mapping is performed on the map A, as illustrated in FIG. 32, it is possible to establish a correspondence between an object node in the abstract representation and an object on the environment map, and determine a chair to be a target of "sitting" for the virtual character, thereby controlling the virtual character to get into a state of "sitting" with respect to the target chair.

"Mapping Template AR Content to Different AR Application Scene Using Abstract Representation of Scene"

An example of mapping the template AR content in FIG. 31 to a different AR application scene will be described below. Here, consideration will be given to mapping to an AR application scene environment map (hereinafter referred to as a "map B") as illustrated in FIG. 33(*a*), which is different from the template AR environment map in the arrangement and quantity of chairs.

Figure 33A:
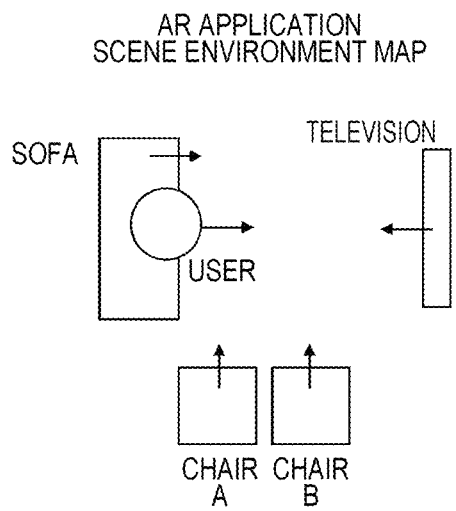
FIG. 33 is a diagram illustrating an example of an AR application scene environment map (map B) and an abstract representation of a scene that has been acquired.
Figure 33B:
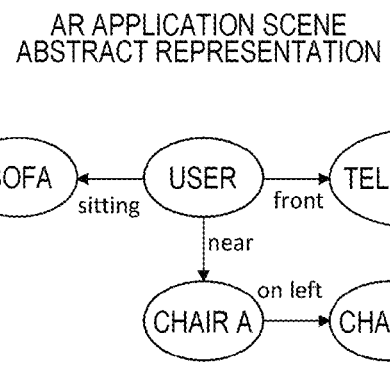

As illustrated in FIG. 33(*a*), in the map B, the chair A is arranged on a side opposite to the position in the map A, and the chair B is arranged next to the chair A. At this time, in a case where the information of the map B shows that the chair A and the user have a relationship "near" and the chair A and the chair B have a relationship "on left", an abstract representation of a scene for the map B can be obtained as illustrated in FIG. 33(*b*).

Figure 34:
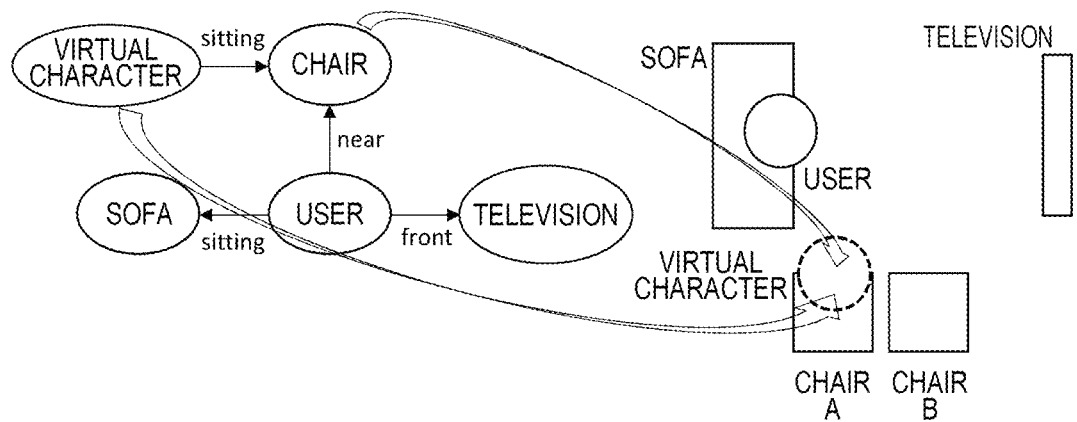
FIG. 34 is a diagram illustrating an example of mapping AR content on the basis of a template AR abstract representation (map A to map B).

As compared with the template AR abstract representation illustrated in FIG. 31(*b*), a partial graph constituted by the sofa, the user, the television, and the chair A matches with a template AR abstract representation graph. Thus, the chair in the map A can be associated with the chair A in the map B. Therefore, as illustrated in FIG. 34, by controlling the virtual character to be in a "sitting" state with respect to the chair A, it is possible to map the template AR content created in the map A to the map B.

"Mapping Template AR Content to Scene in which Plurality of Mapping Candidates Exists"

Next, an example of mapping content to an environment map (hereinafter referred to as a "map C") of a different AR application scene in which the chair arrangement condition has been changed as illustrated in FIG. 35(*a*) will be described. In the map C, on the assumption that the chair A and the chair B of the user are arranged on both sides of the user and a positional relationship (on left, on right, or near) with respect to the user has been obtained for each of the chairs, an abstract representation of a scene for the map C can be obtained as illustrated in FIG. 35(*b*).

The template AR content created in the map A can be mapped to the map C via the abstract representation by performing matching between the template AR abstract representation excluding the node (virtual character) related to the AR content and the scene abstract representation of the map C.

Figure 36B:
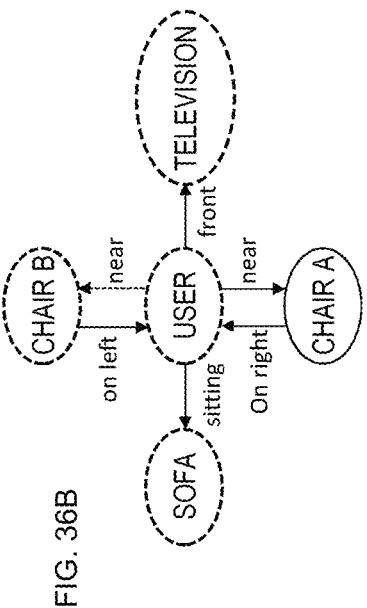
FIG. 36 is a diagram illustrating a case where a plurality of matching candidates exists.
Figure 36C:
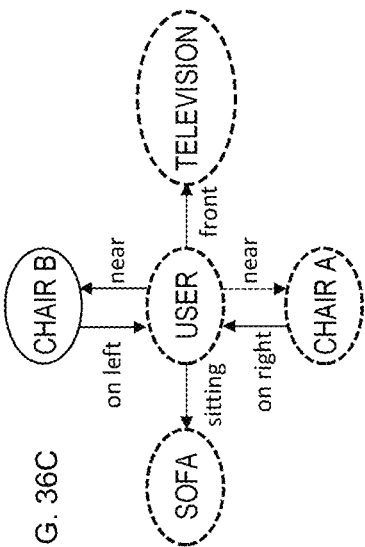
Figure 36A:
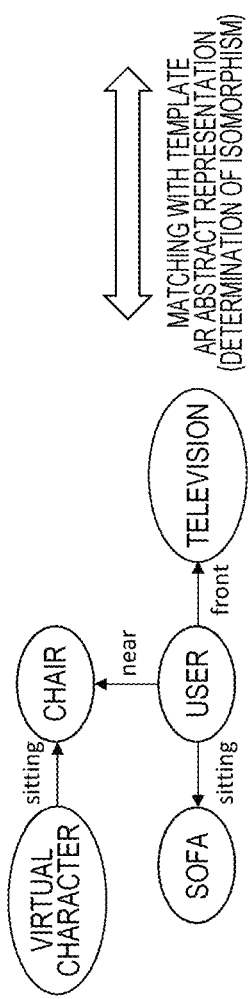
Figure 37:
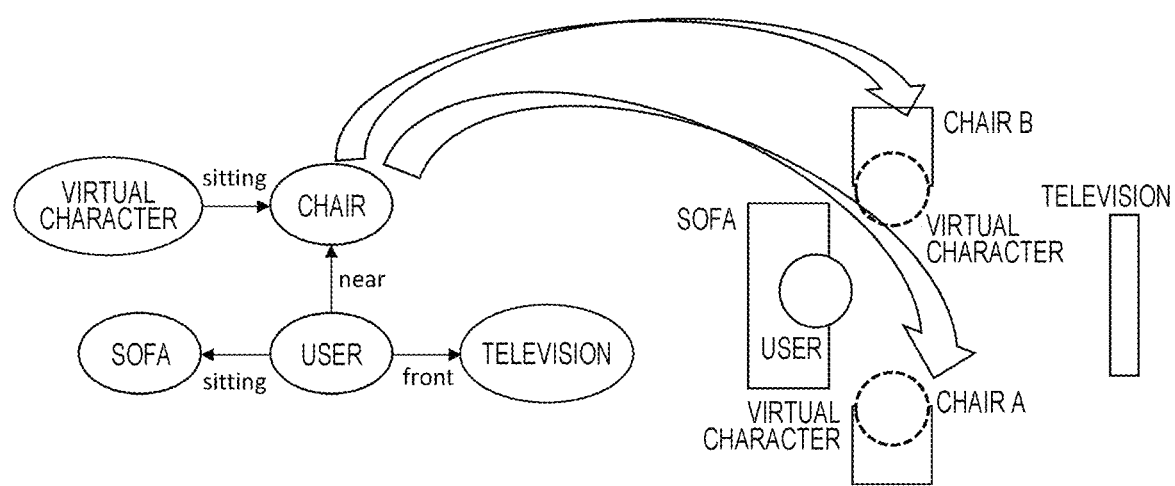
FIG. 37 is a diagram illustrating an example of mapping AR content on the basis of a template AR abstract representation (map A to map C; any one of candidates is selected on the basis of a condition or a constraint determined by a content creator).

At this time, in this case in which the map A has been used for the creation, two types of portions that are isomorphic to the template AR abstract representation illustrated in FIG. 36(a) are included, as indicated by broken lines for identification in FIGS. 36(b) and (c). Thus, as illustrated in FIG. 37, mapping is conceivable in which the virtual character sits on either the chair A or the chair B.

At this time, the chair to be mapped is selected from candidates on the basis of a condition or a constraint determined in advance by a template AR content creator. Specifically, the condition or constraint that can be considered includes one having a higher evaluation value for the relationship "near" with the user (e.g., one having a smaller Euclidean distance), one facing a direction closer to the user, or the like.

Selection results based on such a condition or a constraint are fixed to one result unless the environment map is updated. Thus, there is no guarantee that a selection result as intended by the user is obtained. That is, the framework described above has a disadvantage that, unless the user configures an environment map that satisfies a condition or a constraint for mapping on the basis of details of the condition or the constraint, mapping as intended by the user cannot be guaranteed, and it is not possible to perform mapping that does not satisfy such a condition or constraint (e.g., purposely selecting a chair having a second highest evaluation value for "near").

"Mapping Template AR Content Via Editing of Abstract Representation to Scene in Which Plurality of Mapping Candidates Exists"

An example will be described in which an abstract representation of a scene based on an environment map acquired in the map C is not directly used for mapping, but is used via a step of editing the abstract representation.

Figure 35A:
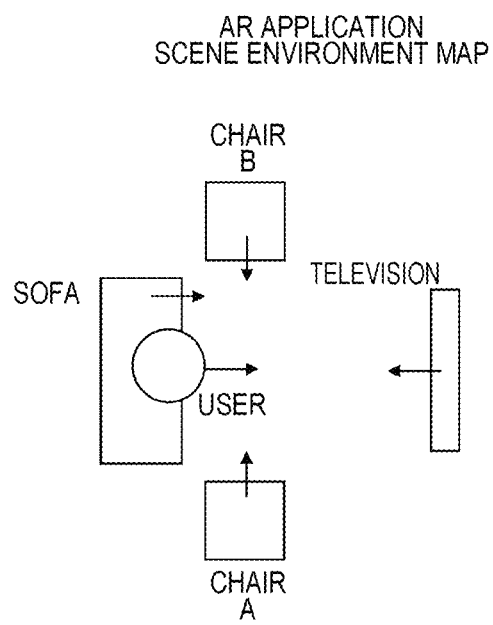
FIG. 35 is a diagram illustrating an example of an AR application scene environment map (map C) and an abstract representation of a scene that has been acquired.
Figure 35B:
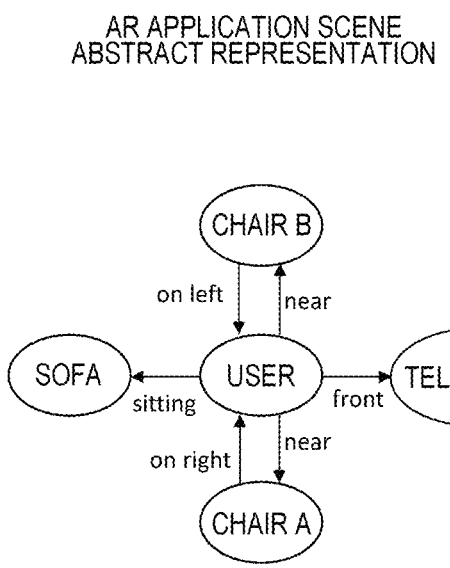

The left side of FIG. 38(a) illustrates, similarly to FIG. 35(b), an abstract representation of a scene acquired from the map C illustrated in FIG. 35(a). A user performs an input operation of editing the abstract representation of the scene to acquire an abstract representation of the scene as illustrated on the right side of FIG. 38(a). Here, the relationship "near" acquired between the chair A and the user has been deleted from the abstract representation. When the abstract representation is edited, a graph representing the scene abstract representation may be presented to the user on a GUI by some video display device. Editing including not only deletion of a relationship but also addition of a new relationship, a change of an attribute of an object, and the like can be performed by a variety of input methods such as text, voice, and touch operation.

Figure 39:
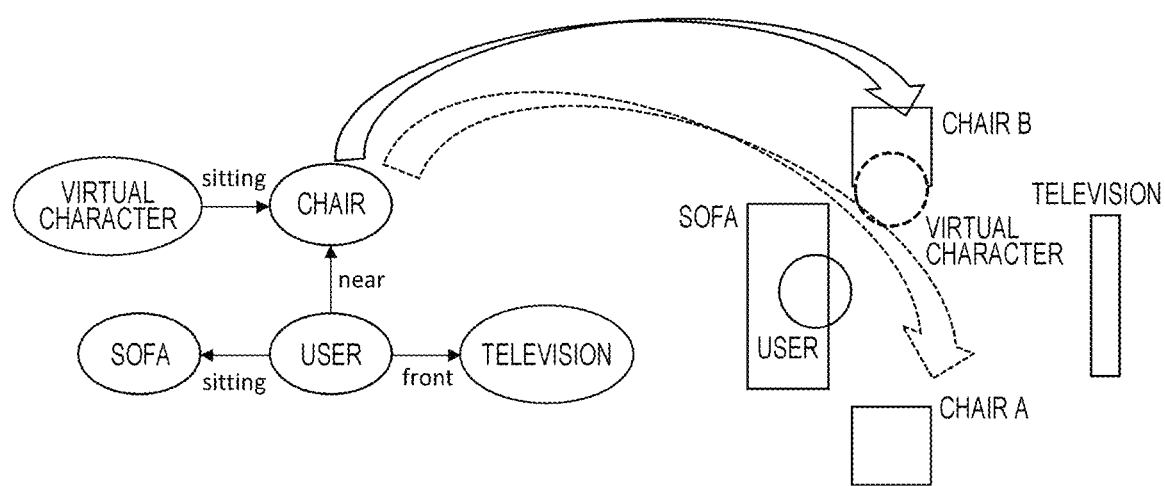
FIG. 39 is a diagram illustrating an example of mapping AR content determined on the basis of an abstract representation of an edited scene (map A to map C; a mapping result can be changed in a wide variety of ways by a user editing the abstract representation in accordance with the user's intention).

By using the edited abstract representation of the scene as illustrated on the right side of FIG. 38(a) and the template AR abstract representation, it is possible to perform unique AR content mapping for the map C as illustrated in FIG. 39. Furthermore, in a case where the relationship "near" of the chair B is deleted in an opposite manner under the same condition, the template AR content can be mapped to the chair A this time.

Furthermore, the user can perform an input operation of editing the template AR abstract representation illustrated on the left side of FIG. 38(b) to acquire an abstract representation of the scene as illustrated on the right side of FIG. 38(b), thereby performing unique AR content mapping for the map C as illustrated in FIG. 39.

As described above, by combining template AR content mapping via the abstract representation of the scene and an operation of editing the abstract representation of the scene, it is possible to change the result of mapping the template AR content just by the operation of editing the abstract representation by the user, without changing the arrangement condition in the map C. It is therefore possible to perform content mapping as intended by the user and adaptation of one template AR content to a wide variety of individual environments.

2. Modified Example

"Automatic Adaptation System Based on Accumulation of Information Regarding Editing of Template or AR Application Environment"

Figure 40:
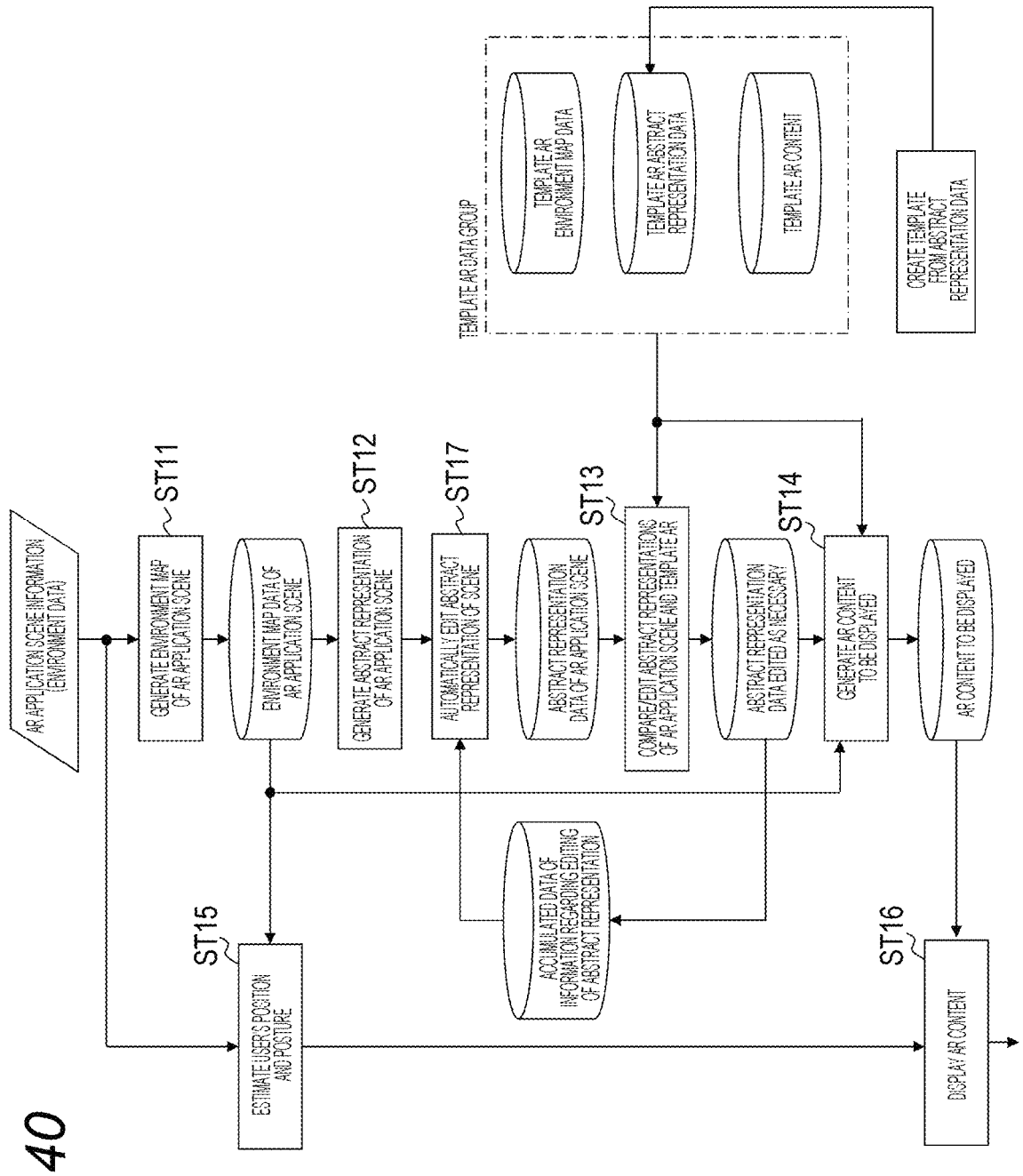
FIG. 40 is a diagram for illustrating an automatic adaptation system based on accumulation of information regarding editing of a template or an AR application environment.

As illustrated in a flowchart in FIG. 40, it is conceivable to accumulate a history of editing an abstract representation of an AR application scene by a user, and further provide a processing step of automatically editing the abstract representation of the AR application scene in advance (step ST17) when a newly acquired template AR content is displayed. For example, in a case where it is not desired to use a specific object in the AR application scene when the AR content is displayed, it is not necessary to perform an operation of deleting the specific object from the abstract representation for each content, and it is possible to make the setting automatically reflected. Note that, in the flowchart in FIG. 40, portions corresponding to those in the flowchart in FIG. 6 are denoted by the same step numbers.

"Support for Creation of Template AR Content"

Figure 41:
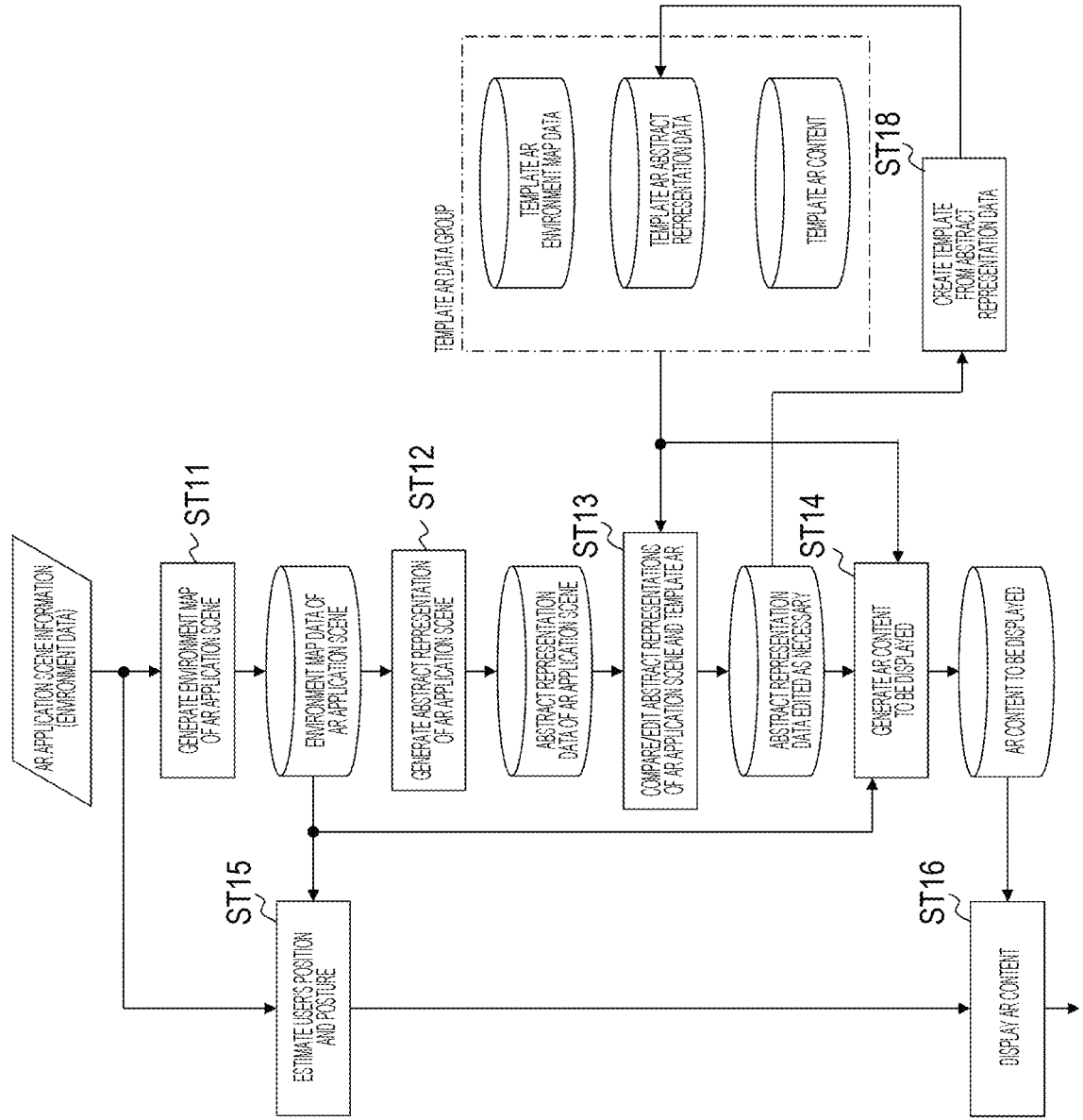
FIG. 41 is a diagram for illustrating support for creation of template AR content.

By using the edited abstract representation of the template AR as a new template (processing of step ST18) as illustrated in a flowchart in FIG. 41, it is possible to reduce the cost of template creation by a content creator. A user may edit and share content so that a content creator can perform an operation on the edited content. Alternatively, a content creator may create a base template in advance and use the base template to create a derivative template. Note that, in the flowchart in FIG. 41, portions corresponding to those in the flowchart in FIG. 6 are denoted by the same step numbers.

"AR Simulation System Using Substitute"

By configuring an environment to which AR is to be applied with mock-ups using substitutes regardless of scale or category, and editing an abstract representation obtained for them in accordance with a template, it is possible to perform simulation of reproducing AR content, without the need for going to a production environment to which AR is applied. For example, it is possible to simulate AR display in a room by measuring a model or prototype of the room in a scale that allows the model or prototype to be placed on a desk, and editing and displaying the abstract representation of them. As content that can be presented as a simulation, for example, an action plan of an agent such as a robot or a virtual character indoors can be considered.

Furthermore, the preferred embodiment of the present disclosure has been described in detail with reference to the accompanying drawings, but the technical scope of the present disclosure is not limited to such an example. It is obvious that a person having ordinary knowledge in the technical field of the present disclosure can come up with various changes and modifications within the scope of the technical idea described in the claims, and such various changes and modifications are naturally understood to belong to the technical scope of the present disclosure.

Furthermore, the effects described in the present specification are merely illustrative or exemplary, and are not restrictive. That is, the technology according to the present disclosure can exhibit other effects that are obvious to those skilled in the art from the description in the present specification, in addition to or instead of the above effects.

Note that the present technology can also be configured as described below.

(1) An information processing apparatus including:

an environment map generation unit configured to generate an environment map of an augmented reality application scene;

an abstract representation generation unit configured to generate an abstract representation of an augmented reality application scene on the basis of the environment map of the augmented reality scene; and a display content generation unit configured to generate augmented reality content for display by comparing the abstract representation of the augmented reality application scene with an abstract representation of a template augmented reality generated on the basis of a template augmented reality environment map, and mapping template augmented reality content to the augmented reality application scene on the basis of a result of the comparison.

(2) The information processing apparatus according to (1), in which the abstract representations are representations having a graph structure.

(3) The information processing apparatus according to (1) or (2), further including:

an abstract representation editing unit configured to edit the abstract representation of the augmented reality application scene or the abstract representation of the template augmented reality.

(4) The information processing apparatus according to (3), in which the abstract representation editing unit includes:

an abstract representation presenting unit configured to present, to a user, the abstract representation of the augmented reality application scene and the abstract representation of the template augmented reality side by side; and a user interface unit configured to allow the user to perform an operation of making a change to the abstract representation of the augmented reality application scene or the abstract representation of the template augmented reality on the basis of the presentation.

(5) The information processing apparatus according to (4), in which when a plurality of partially isomorphic portions corresponding to the abstract representation of the template augmented reality exists in the abstract representation of the augmented reality application scene, the abstract representation presenting unit presents the plurality of partially isomorphic portions in such a manner as to be recognizable by the user.

(6) The information processing apparatus according to any one of (3) to (5), in which when the abstract representation editing unit has edited the abstract representation of the augmented reality application scene or the abstract representation of the template augmented reality, the display augmented reality content generation unit compares the abstract representation of the augmented reality application scene with the abstract representation of the template augmented reality after the change operation.

(7) The information processing apparatus according to any one of (3) to (6), further including:

an automatic editing unit configured to automatically edit the abstract representation of the augmented reality application scene generated by the abstract representation generation unit on the basis of information regarding editing the augmented reality application scene by the abstract representation editing unit.

(8) The information processing apparatus according to any one of (3) to (7), in which the abstract representations are representations having a graph structure, and the editing includes an operation of changing a relationship between nodes or an operation of changing an attribute of a node.

(9) An information processing method including:

a step of generating an environment map of an augmented reality application scene;

a step of generating an abstract representation of an augmented reality application scene on the basis of the environment map of the augmented reality scene; and a step of generating content for display by comparing the abstract representation of the augmented reality application scene with an abstract representation of a template augmented reality generated on the basis of a template augmented reality environment map, and mapping template augmented reality content to the augmented reality application scene on the basis of a result of the comparison.

(10) A program for causing a computer to function as:

environment map generation means configured to generate an environment map of an augmented reality application scene;

abstract representation generation means configured to generate an abstract representation of an augmented reality application scene on the basis of the environment map of the augmented reality scene; and display augmented reality content generation means configured to generate augmented reality content for display by comparing the abstract representation of the augmented reality application scene with an abstract representation of a template augmented reality generated on the basis of a template augmented reality environment map, and mapping template augmented reality content to the augmented reality application scene on the basis of a result of the comparison.

REFERENCE SIGNS LIST

10 Information processing system
11 AR glasses
12 Information processing
13 Network
111 Control unit
112 Camera
113 Sensor
114 Communication unit
115 Display unit
116 Memory
181 AR application scene information acquisition unit
182 AR application scene environment map generation unit
183 AR application scene abstract representation generation unit
184 Template AR data group storage unit
185 Abstract representation comparison/editing unit
186 Display AR content generation unit
187 Estimation unit
188 Display control unit

The invention claimed is:
1. An information processing apparatus, comprising:
at least one processor configured to:

generate an environment map of an augmented reality application scene;

generate a first abstract representation of the augmented reality application scene based on the environment map of the augmented reality application scene; and generate augmented reality content based on:
  comparison of first relationships between a first plurality of nodes of the first abstract representation of the augmented reality application scene with second relationships between a second plurality of nodes of a second abstract representation of a template augmented reality, wherein the second abstract representation is generated based on a template augmented reality environment map, and
  template augmented reality content that is mapped to the augmented reality application scene based on a result of the comparison.

2. The information processing apparatus according to claim 1, wherein
  each of the first abstract representation and the second abstract representation includes a graph structure.

3. The information processing apparatus according to claim 1, wherein the at least one processor is further configured to edit the first abstract representation of the augmented reality application scene or the second abstract representation of the template augmented reality.

4. The information processing apparatus according to claim 3, wherein the at least one processor is further configured to:
  control display of the first abstract representation of the augmented reality application scene and the second abstract representation of the template augmented reality side by side; and
  receive an operation related to a change to the displayed first abstract representation of the augmented reality application scene or the displayed second abstract representation of the template augmented reality.

5. The information processing apparatus according to claim 4, wherein the at least one processor is further configured to:
  determine whether a plurality of partially isomorphic portions corresponding to the second abstract representation of the template augmented reality exists in the first abstract representation of the augmented reality application scene; and
  present the plurality of partially isomorphic portions such that the plurality of partially isomorphic portions is user recognizable.

6. The information processing apparatus according to claim 3, wherein
  based on the edit of the first abstract representation of the augmented reality application scene or the second abstract representation of the template augmented reality, the at least one processor is further configured to
  compare the first relationships of the first abstract representation of the augmented reality application scene with the second relationships of the second abstract representation of the template augmented reality.

7. The information processing apparatus according to claim 3, wherein the at least one processor is further configured to automatically edit the first abstract representation of the augmented reality application scene based on information regarding the edit of the augmented reality application scene.

8. An information processing apparatus, comprising:
at least one processor configured to:

generate an environment map of an augmented reality application scene;

generate a first abstract representation of the augmented reality application scene based on the environment map of the augmented reality application scene;

generate augmented reality content based on:
  comparison of the first abstract representation of the augmented reality application scene with a second abstract representation of a template augmented reality, wherein the second abstract representation is generated based on a template augmented reality environment map, and
  template augmented reality content that is mapped to the augmented reality application scene based on a result of the comparison; and edit the first abstract representation of the augmented reality application scene or the second abstract representation of the template augmented reality, wherein
  each of the first abstract representation and the second abstract representation includes a graph structure, and
  the edit of the first abstract representation or the second abstract representation includes an operation to change a relationship between nodes of the graph structure or an operation to change an attribute of a node of the nodes.

9. An information processing method, comprising:
in an information processing apparatus:
  generating an environment map of an augmented reality application scene;
  generating a first abstract representation of the augmented reality application scene based on the environment map of the augmented reality application scene; and
  generating augmented reality content based on:
    comparison of first relationships between a first plurality of nodes of the first abstract representation of the augmented reality application scene with second relationships between a second plurality of nodes of a second abstract representation of a template augmented reality, wherein the second abstract representation is generated based on a template augmented reality environment map, and
    mapping of template augmented reality content to the augmented reality application scene based on a result of the comparison.

10. A non-transitory computer-readable medium having stored thereon, computer-executable instructions which, when executed by an information processing apparatus, cause the information processing apparatus to execute operations, the operations comprising:
  generating an environment map of an augmented reality application scene;
  generating a first abstract representation of the augmented reality application scene based on the environment map of the augmented reality application scene; and
  generating augmented reality content for display based on:
    comparison of first relationships between a first plurality of nodes of the first abstract representation of the augmented reality application scene with second relationships between a second plurality of nodes of a second abstract representation of a template augmented reality, wherein the second abstract representation is generated based on a template augmented reality environment map, and mapping of template augmented reality content to the augmented reality application scene based on a result of the comparison.

* * * * *